United States Patent [19]

Ota et al.

[11] Patent Number: 4,726,666
[45] Date of Patent: Feb. 23, 1988

[54] TWO-GROUP ZOOM LENS

[75] Inventors: Kohei Ota; Toshiko Shimokura, both of Hachioji, all of Japan

[73] Assignee: Konishiroku Photo Industry Co., Ltd., Tokyo, Japan

[21] Appl. No.: 784,369

[22] Filed: Oct. 4, 1985

[30] Foreign Application Priority Data

Oct. 5, 1984 [JP] Japan .................. 59-208343
Oct. 5, 1984 [JP] Japan .................. 59-208344

[51] Int. Cl.⁴ .................. G02B 15/14; G02B 13/18
[52] U.S. Cl. .................. 350/426; 350/432
[58] Field of Search .................. 350/426, 432

[56] References Cited

U.S. PATENT DOCUMENTS 4,540,249  9/1985  Mogami .................. 350/432

Primary Examiner—John K. Corbin
Assistant Examiner—Rebecca D. Gass
Attorney, Agent, or Firm—Jordan B. Bierman

[57] ABSTRACT

A zoom lens is known which has a first lens group having a negative refracting power and a second lens group having a positive refracting power arranged from an object side, a spacing between both the lens groups being varied to thereby vary magnification (variable power). In order to make such zoom lens compact, the refracting power of the negative lens group is intensified and the negative refracting power is arranged in a portion at the rear of the positive lens group. The portion in the positive lens group is composed of a set of positive and negative lenses, and at least one surface of the lenses is made to be an aspherical surface to correct aberrations.

8 Claims, 160 Drawing Figures

FIG. 1
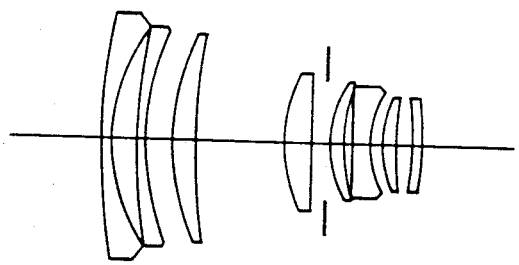
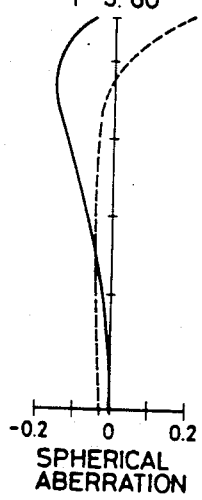
FIG.2A
f = 36.2
F 3.60
-0.2 0 0.2
SPHERICAL
ABERRATION
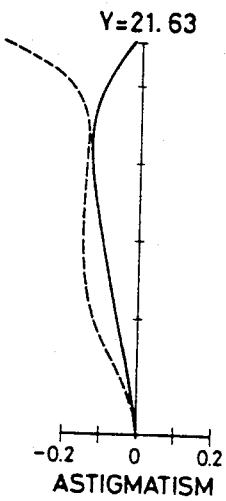
FIG.2B
f = 36.2
Y=21.63
-0.2 0 0.2
ASTIGMATISM
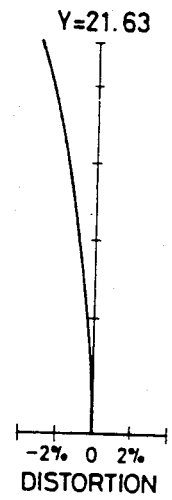
FIG.2C
f = 36.2
Y=21.63
-2% 0 2%
DISTORTION f = 50.5

-0.2  0  0.2
SPHERICAL ABERRATION
F 4.10 f = 50.5

-0.2  0  0.2
ASTIGMATISM
Y=21.63 f = 50.5

-2‰  0  2‰
DISTORTION
Y=21.63 f = 68.4

-0.2  0  0.2
SPHERICAL ABERRATION
F 4.60 f = 68.4

-0.2  0  0.2
ASTIGMATISM
Y=21.63 f = 68.4

-2‰  0  2‰
DISTORTION
Y=21.63 f=36.2

SPHERICAL ABERRATION f=36.2

ASTIGMATISM f=36.2

DISTORTION f=51.2 f=51.2 f=51.2 f=68.4 f=68.4 f=68.4

FIG. 9
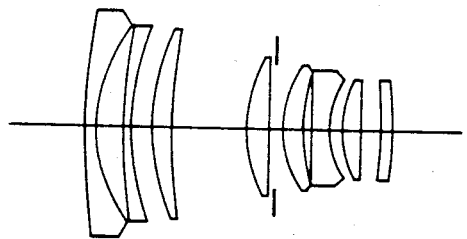
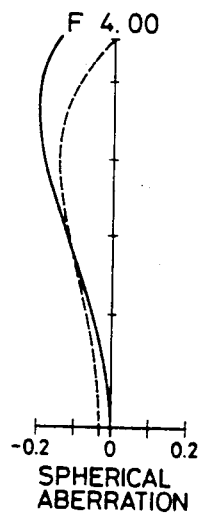
FIG.10A
f=36.0
F 4.00
-0.2  0  0.2
SPHERICAL
ABERRATION
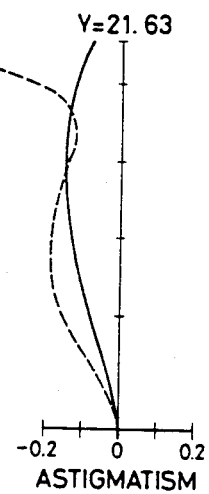
FIG.10B
f=36.0
Y=21.63
-0.2  0  0.2
ASTIGMATISM
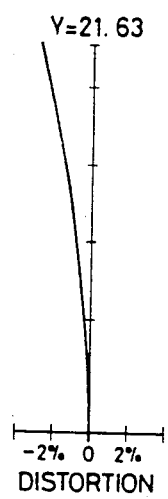
FIG.10C
f=36.0
Y=21.63
-2%  0  2%
DISTORTION f=49.9

SPHERICAL ABERRATION f=49.9

ASTIGMATISM f=49.9

DISTORTION f=68.2

SPHERICAL ABERRATION f=68.2

ASTIGMATISM f=68.2

DISTORTION

SPHERICAL ABERRATION

ASTIGMATISM

DISTORTION

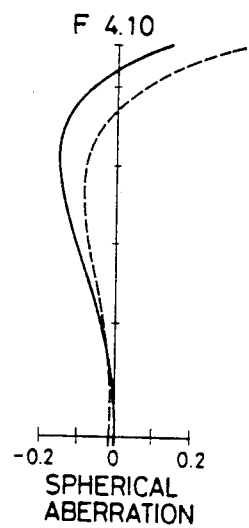 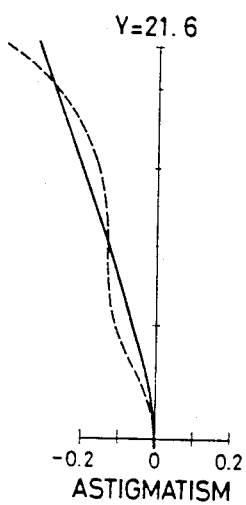 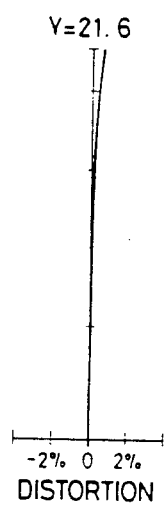 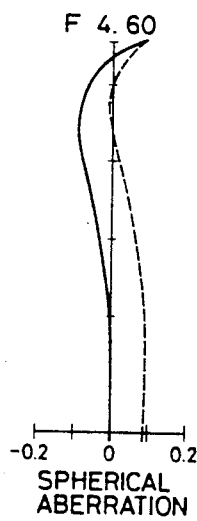 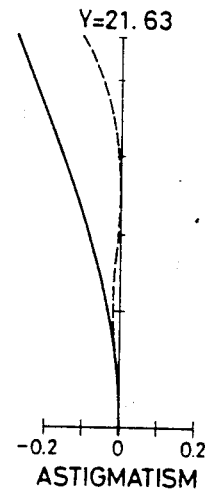 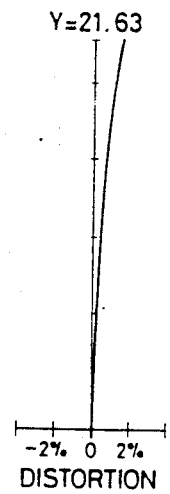

FIG. 17
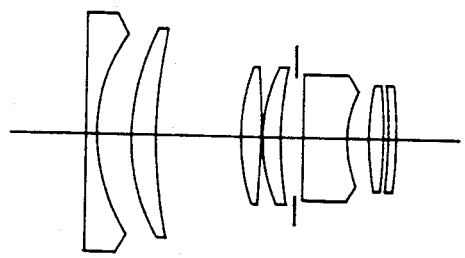
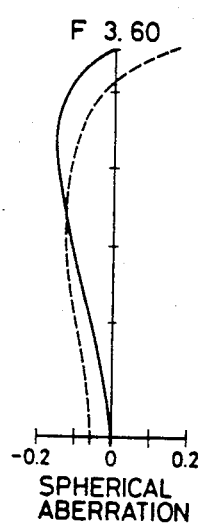
FIG. 18A
F 3.60
-0.2 0 0.2
SPHERICAL
ABERRATION
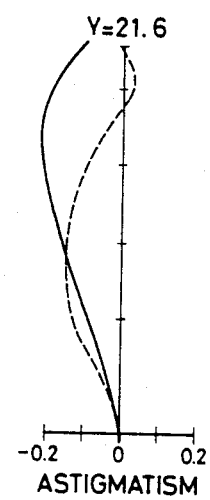
FIG. 18B
Y=21.6
-0.2 0 0.2
ASTIGMATISM
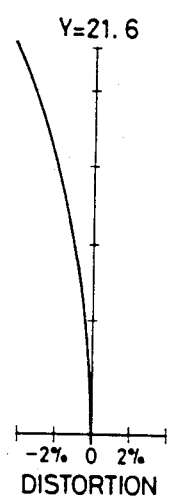
FIG. 18C
Y=21.6
-2% 0 2%
DISTORTION

F 4.10
-0.2 0 0.2
SPHERICAL ABERRATION

Y=21.6
-0.2 0 0.2
ASTIGMATISM

Y=21.6
-2‰ 0 2‰
DISTORTION

F 4.60
-0.2 0 0.2
SPHERICAL ABERRATION

Y=21.6
-0.2 0 0.2
ASTIGMATISM

Y=21.6
-2‰ 0 2‰
DISTORTION

FIG. 21
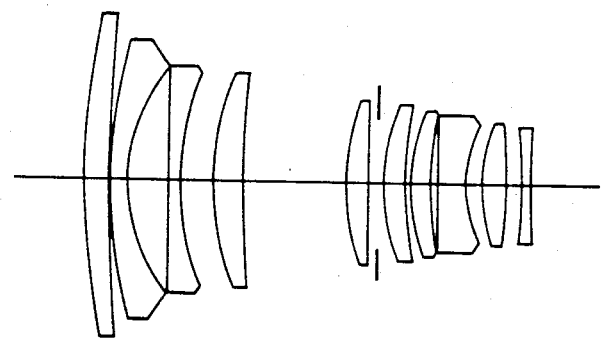
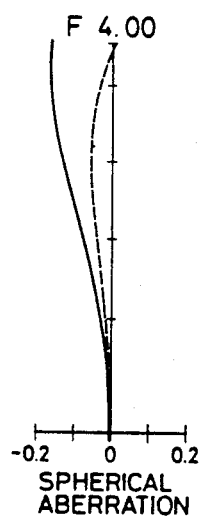
FIG.22A
f = 28.8
F 4.00
-0.2  0  0.2
SPHERICAL
ABERRATION
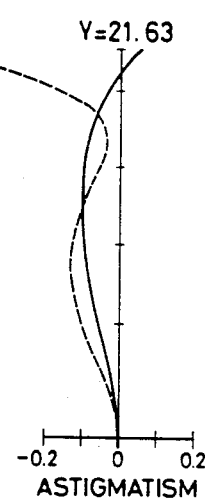
FIG.22B
f = 28.8
Y=21.63
-0.2  0  0.2
ASTIGMATISM
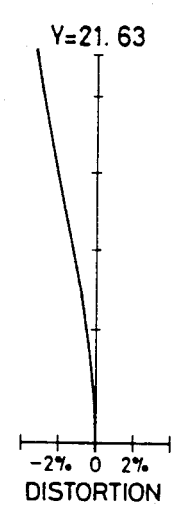
FIG.22C
f = 28.8
Y=21.63
-2%  0  2%
DISTORTION

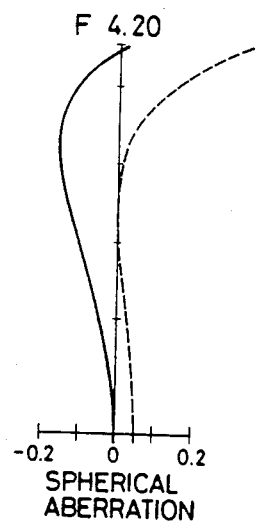
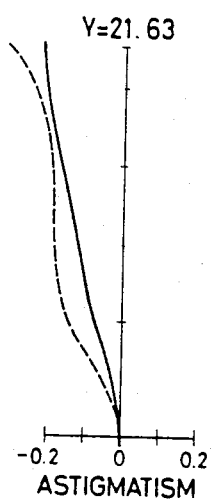
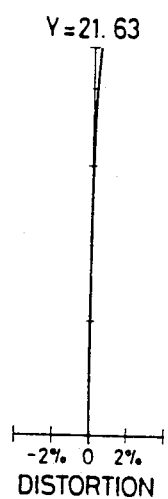
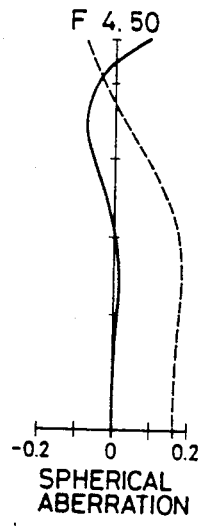
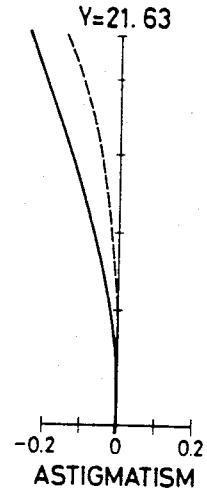
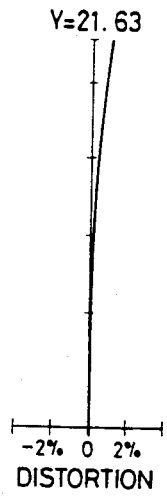

F 3.60

-0.2  0  0.2
SPHERICAL
ABERRATION

Y=21.63

-0.2  0  0.2
ASTIGMATISM

Y=21.63

-2%  0  2%
DISTORTION

FIG. 29
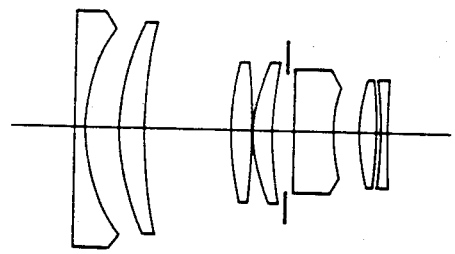
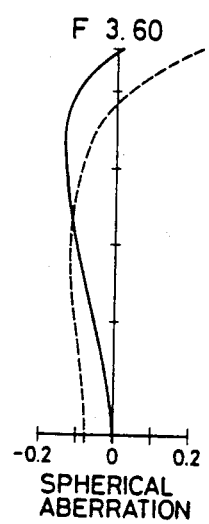
FIG. 30A
F 3.60
-0.2  0  0.2
SPHERICAL
ABERRATION
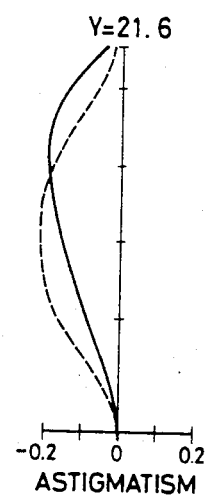
FIG. 30B
Y=21.6
-0.2  0  0.2
ASTIGMATISM
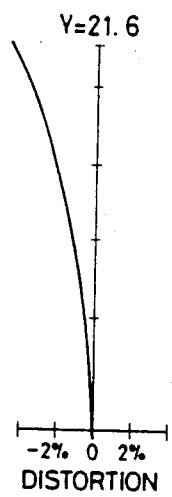
FIG. 30C
Y=21.6
-2%  0  2%
DISTORTION

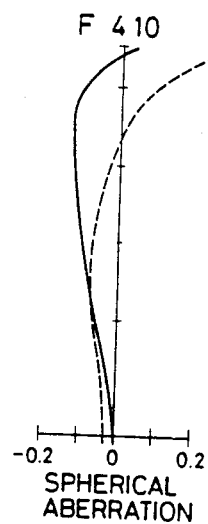 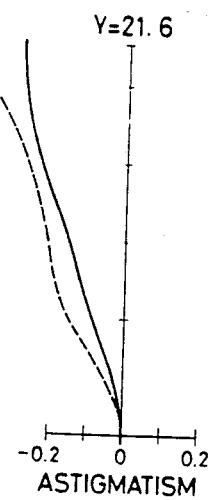 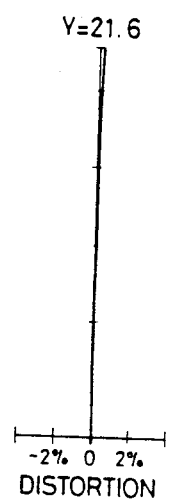
FIG. 31A  FIG. 31B  FIG. 31C
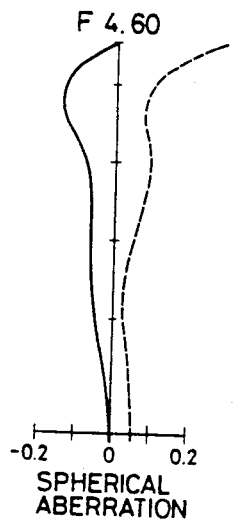 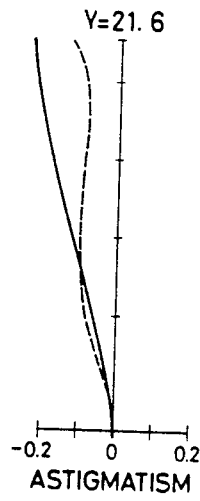 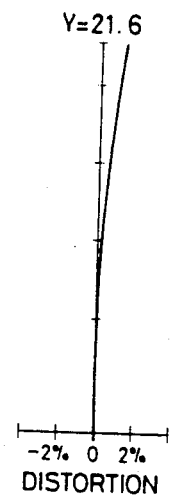
FIG. 32A  FIG. 32B  FIG. 32C

F 4.00

-0.2  0  0.2
SPHERICAL
ABERRATION

Y=21.6

-0.2  0  0.2
ASTIGMATISM

Y=21.6

-2%  0  2%
DISTORTION

FIG. 37
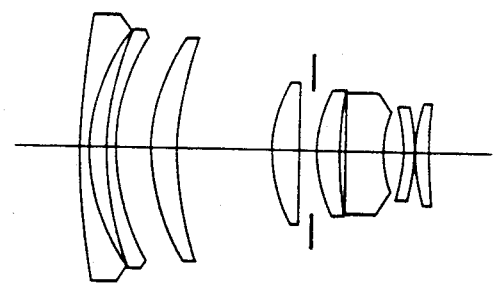
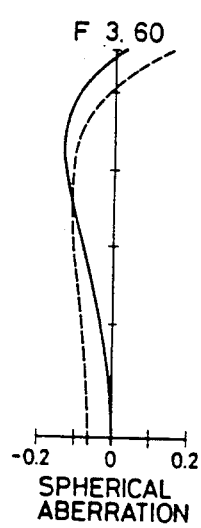
FIG. 38A
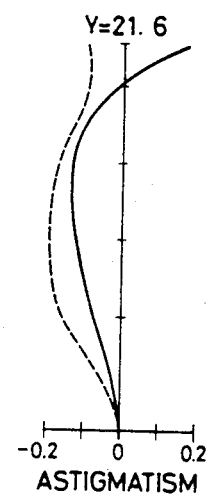
FIG. 38B
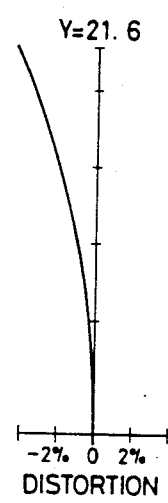
FIG. 38C

F 3.60
-0.2 0 0.2
SPHERICAL ABERRATION

Y=21.6
-0.2 0 0.2
ASTIGMATISM

Y=21.6
-2% 0 2%
DISTORTION

F 4.10
-0.2  0  0.2
SPHERICAL ABERRATION

Y=21.6
-0.2  0  0.2
ASTIGMATISM

Y=21.6
-2%  0  2%
DISTORTION

F 4.60
-0.2  0  0.2
SPHERICAL ABERRATION

Y=21.6
-0.2  0  0.2
ASTIGMATISM

Y=21.6
-2%  0  2%
DISTORTION f=28.9 f=28.9 f=28.9 f=44.4 f=44.4 f=44.4 f=68.2 f=68.2 f=68.2

FIG. 49
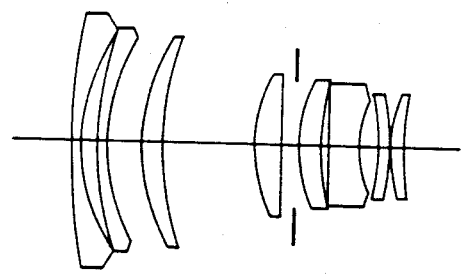
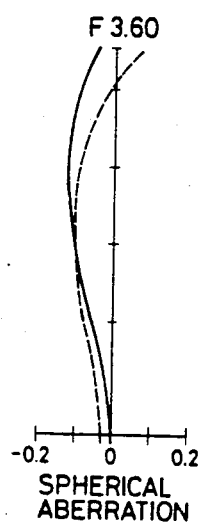
FIG.50A
F 3.60
-0.2 0 0.2
SPHERICAL
ABERRATION
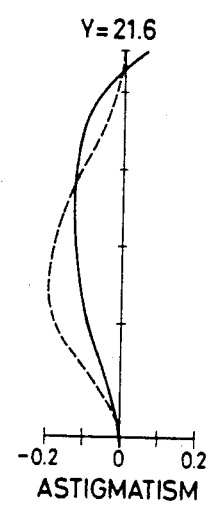
FIG.50B
Y=21.6
-0.2 0 0.2
ASTIGMATISM
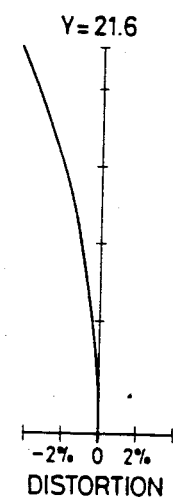
FIG.50C
Y=21.6
-2% 0 2%
DISTORTION FIG. 53
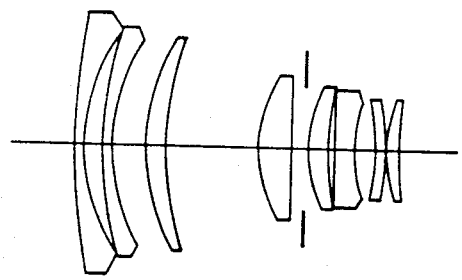
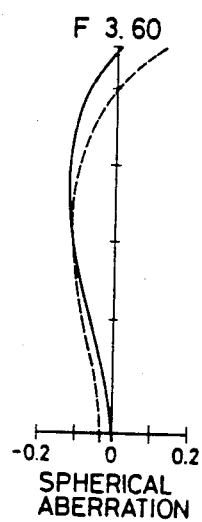
FIG.54A
F 3.60
-0.2　0　0.2
SPHERICAL
ABERRATION
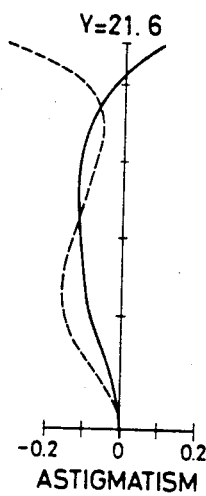
FIG.54B
Y=21.6
-0.2　0　0.2
ASTIGMATISM
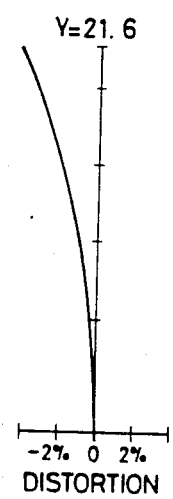
FIG.54C
Y=21.6
-2%　0　2%
DISTORTION

SPHERICAL ABERRATION

ASTIGMATISM

DISTORTION

F 4.10
-0.2 0 0.2
SPHERICAL
ABERRATION

Y=21.6
-0.2 0 0.2
ASTIGMATISM

Y=21.6
-2% 0 2%
DISTORTION

F 4.60
-0.2 0 0.2
SPHERICAL
ABERRATION

Y=21.6
-0.2 0 0.2
ASTIGMATISM

Y=21.63
-2% 0 2%
DISTORTION

FIG. 61
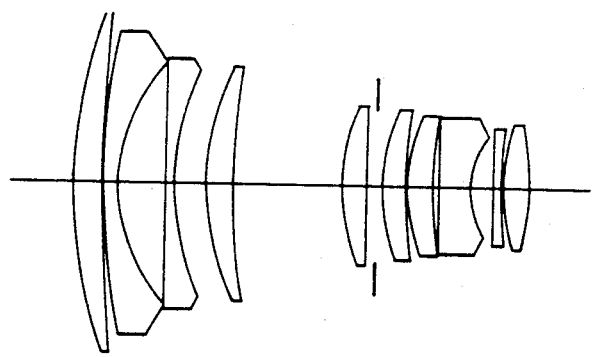
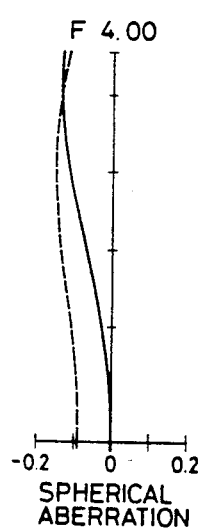
FIG.62A
F 4.00
-0.2  0  0.2
SPHERICAL
ABERRATION
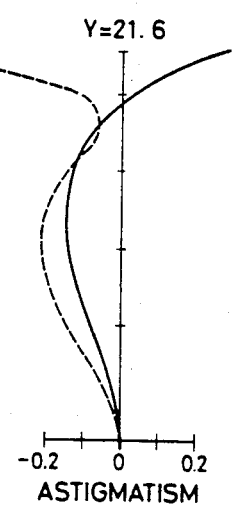
FIG.62B
Y=21.6
-0.2  0  0.2
ASTIGMATISM
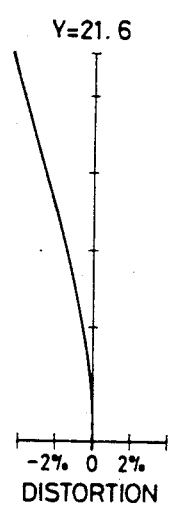
FIG.62C
Y=21.6
-2%  0  2%
DISTORTION

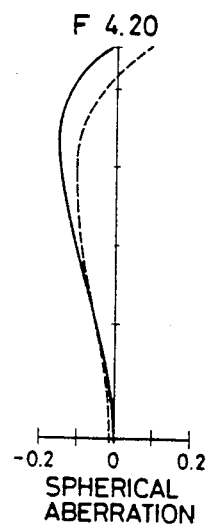
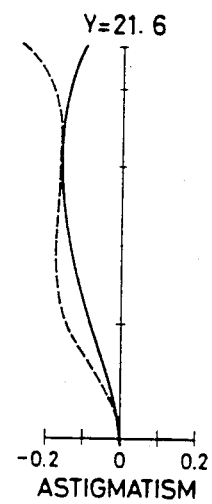
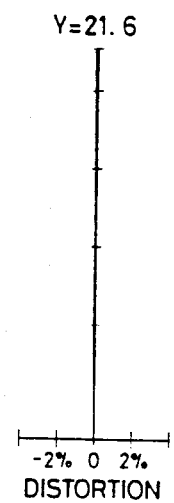
FIG. 63A — SPHERICAL ABERRATION (F 4.20)
FIG. 63B — ASTIGMATISM (Y=21.6)
FIG. 63C — DISTORTION (Y=21.6)
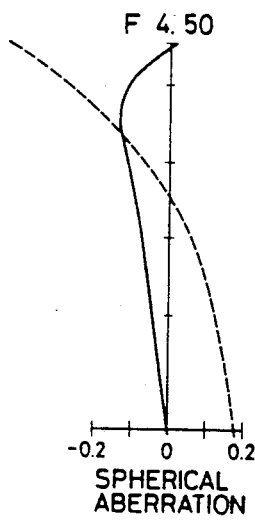
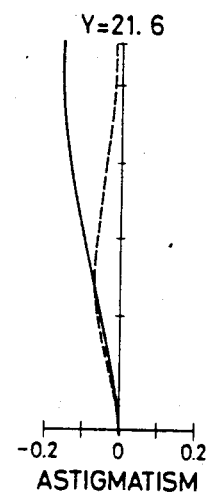
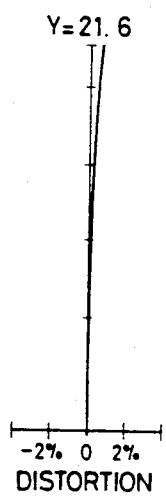
FIG. 64A — SPHERICAL ABERRATION (F 4.50)
FIG. 64B — ASTIGMATISM (Y=21.6)
FIG. 64C — DISTORTION (Y=21.6)

TWO-GROUP ZOOM LENS

BACKGROUND OF THE INVENTION

1. Field of the Invention

The present invention relates to a two-group zoom photographic lens whose lens length and lens diameter are small, which includes a standard angle of view and which varies magnification from a wide angle to a long focal point.

2. Description of the Prior Art

Recently, an attempt has been rapidly made to form compact a so-called wide-angle lens having a variable power zone about a standard angle of view.

Among these, two-component wide-angle zoom lens, whose focal length is in the range of from 35 to 70 mm and F number in the range of from 3.5 to 4, has been used widely. However, even in such a zoom lens which has good performance and is relatively compact, the full length thereof is considerably long.

For example, in Embodiment 1 of Japanese Patent Application Laid-Open No. 43619/81, the minimum focal length is fw=36 mm and the maximum focal length is 68.5 mm whilst the length of the lens is wide angle $L_w = 128 = 3.55 \, f_w$, and long focal point $L_T = 113 = 3.14 \, f_w$. If the lens is intended to be formed into compactness without modification, the performance thereof unavoidably deteriorates.

In Japanese Patent Application Laid-Open No. 64811/84, an aspherical surface having a converging function is provided in a part of a negative lens in the front group to form the lens into compactness with a simple structure. In this lens, since the synthesized focal length of the negative lens in the front group is set to be long, the full length of the lens at the end of the long focal point is considerably small whereas the movement amount of zoom increases and the full length of the lens at the end of the short focal point is considerably great. Accordingly, the shortest focusing length of focusing by the lens in the front group cannot be made small. In the configuration of the lens in the rear group of the aforesaid lens, it is not possible to increase the refracting power and thus it is not possible to reduce the focal length of the negative lens in the front group.

In Japanese Patent Application Laid-Open Nos. 111013/83 and 132207/83, a teleconverter is added to the rear portion of a two-component zoom lens to make both length and diameter compact. However, this makes the lens into a three-component type, which not only complicates a mechanism but unavoidably complicates errors or the like in variation of aberrations resulting from variation in spacing between the lenses due to zooming as compared with the two-component type.

The lens disclosed in Japanese Patent Application Laid-Open No. 114236/79 has a simple configuration in which negative lenses in the front group comprise two groups and two or three lenses, an positive lenses in the rear group comprise four to five lenses but involves a problem in that the full length of the lens is great. For example, in Embodiment 1 of said patent, the short focal length is $f_w = 43.8$ and the long focal length is $f_T = 72.8$ while the focal length of the front group lens is long, $f_f = -91$. Because of this, the lens length at the long focal point is relatively small, $L_T = 98.6$ while lens extension at zooming or focusing is great and the lens length at the short focal point is great, $L_w = 122.0$. On the other hand, the focal length of the front group lens is small, $f_f = -62.5$ and the extension is small. In Embodiment 3, the lens length is $f_w = 41.0$ and the focal length is $f_T = 73.5$ while the full length of the lens is $L_w = 121.5$ and $L_T = 115.0$, which cannot be said small. This results from the fact that the number of lenses in the rear group increases due to correction for aberrations to increase the size of lens accordingly.

Furthermore, Japanese Patent Application Laid-Open No. 121011/83 is being disclosed as an example which uses an aspherical surface. According to this lens, an aspherical surface is introduced into a negative lens in the front group to provide compactness and high performance. However, this lens is large in consideration of $L_w = 140.8$ and $L_T = 137.2$ while $f_w = 28.7$ and $f_T = 81.6$ and of approximately 3 of zoom ratio. Moreover, correction for aberrations is not sufficient due to the remaining aberrations caused by the lens in the rear group.

SUMMARY OF THE INVENTION

It is an object of the present invention to provide a two-component wide angle zoom lens which principally introduces a shape and an aspherical surface of lenses in the rear group whereby both length and lens diameter are small over the entire zooming zone, the shortest focusing length is small and the performance is excellent.

CONSTRUCTION OF THE INVENTION

Means for Solving the Problems (1) A zoom lens system comprising two groups, namely, a front group I having a negative refracting power as a whole and a rear group II having a positive refracting power as a whole, wherein an air space between the front and rear groups is varied to thereby effect zooming, characterized in that the rear-group lens including a set of lenses arranged in order of positive and negative or negative and positive as viewed from the object side at the rearmost portion thereof, at least one surface of the positive and negative lenses being formed into an aspherical surface, and the displacement $\Delta X$ of the aspherical surface is given, at the height of $\phi = 0.16 \, f_{II}$ from an optical axis, by $$\Delta X = \Delta X_A(0.16f_{II}) - \Delta X_B(0.16f_{II}) + \Delta X_C(0.16f_{II}) - \Delta X_D(0.16f_{II}) < 0 \quad (1)$$

where $$\Delta X(\phi) = \frac{C\phi^2}{1 + \sqrt{1 - (1 + k)C^2\phi^2}} + \sum_i A_i \phi_{p_i} - \frac{C^*\phi^2}{1 + \sqrt{1 - C^{*2}\phi^2}}$$

$\phi$: height from an optical axis
$f_{II}$: synthesized focal length of the rear-group lens II
$K$: coefficient of the secondary curve
$C^*$: paraxial curvature ($=C + 2A_i(P_i=2)$)
$\Delta X_A(\phi)$: $\Delta X(\phi)$ of the object side of the positive lens
$\Delta X_B(\phi)$: $\Delta X(\phi)$ of the image side of the positive lens
$\Delta X_C(\phi)$: $\Delta X(\phi)$ of the object side of the negative lens
$\Delta X_D(\phi)$: $\Delta X(\phi)$ of the image side of the negative lens.

(2) Preferably, said displacement $\Delta X$ of the aspherical surface is given, assuming that $f_{II}$ represents the synthesized focal length of the rear-group lens and $\phi = 0.16 f_{II}$ represents the height from the optical axis, by $$1 \times 10^{-0.5} < |\Delta X(0.16 f_{II})/f_{II}| < 5 \times 10^{-0.2}, \Delta X < 0 \quad (2)$$

(3) Further, the front-group lens I of the zoom lens system comprises at least one negative lens and one positive lens in order as viewed from the object side, and the rear-group lens II comprises, in order from the object side, at least two positive lenses, a first negative lens, and one set of positive lens $P_L$ and negative lens $N_L$, which lens is satisfied with $$50 < \nu_p \quad \ldots (3)$$

in case where said one set of lenses are arrayed in order of positive and negative, $$0.10 < l/f_{II} < 0.4 \quad \ldots (4)$$

in case where said lens are arrayed in order of negative and positive, $$0.07 < l/f_{II} < 0.32 \quad \ldots (4')$$

and $$n_pL < 1.78 \quad \ldots (5)$$

where
- $\nu_p$: mean value of Abbe number of glass of at least two positive lenses arrayed in order from the object side in the rear-group lens II
- l: axial length from the rear surface of the first negative lens to the front surface of the negative lens $N_L$
- $n_pL$: refractive index of line d of a lens material of the positive lens $P_L$.

(4) Alternatively, in the lens having the construction as described above (3), the front-group lens I comprises, in order from the object side, a positive lens, at least one negative lens and one positive lens.

Operation

The basical construction of the aforementioned means is as described below:

(1) Both front and rear groups are simple in construction. Thickness, space and shape are compact.

(2) The refracting power of the front-group negative lens I is set intensely. With this, movement amount of zoom is small, and the full length of lens at the short focusing side is not great. Thus, the diameter of the front-group lens is small. Furthermore, the shortest focusing length can be made small.

(3) Since the refracting power of the front-group negative lens I is set intensely, the refracting power of the rear-group positive lens increases. With this, the image magnification of the rear-group positive lens increases to make correction for aberrations difficult. By the increase in the image magnification, the lens back $f_B$ is extended over the entire zooming zone, and the full length of lens, that is the total thickness of lens $+f_B$ increases.

On the other hand, the negative refracting power is arranged at the rear of the rear-group lens whereby the teleratio of the rear-group lens and thus the entire lens system is reduced to restrain the lengthening of the full length of lens.

(4) Correction for various aberrations resulting from intensification of the refracting power of the rear-group positive lens may be facilitated by adding scattering function to the rear-group. More symmetrical arrangement as a whole is employed to facilitate correction for aberrations while employing asymmetrical arrangement in order to reduce the teleratio of the rear-group lens II.

Where arrayal of lens at the rearmost portion is in order of positive and negative, movement of luminous fluxes on and out of axis passing through the negative lens from the optical axis is great and therefor, correction for the image surface curvature is easily made.

Conversely, where arrayal of lens is in order of negative and positive, movement of luminous fluxes on and out of axis passing through the negative lens from the optical axis is small and therefore, correction for spherical aberration is easily made.

(5) The aspherical surface is introduced. However, formation of an aspherical surface in the condition (1) is in a direction of further intensifying the scattering function in the out-of-axis to further intensify the function mentioned in the item (4) above.

From a viewpoint of correction for aberrations, the refracting power of the front-group lens is intensified whereby:

(a) distortion is negative as a whole and large,
(b) negative spherical aberration increases on the long focal point in view of balance relative to a removal of a difference in distortion at the long focal point and short focal point,
(c) since the rear-group lens which is liable to be lengthened due to the intensification of the refracting power of the front-group lens is shortened, the positive refracting power of the forward portion of the rear-group lens has to be intensified. However, this increases negative spherical aberration, and
(d) aberratin is deteriorated by the increase in the image magnification of the rear-group lens.

These are corrected by introduction of the negative lens at the rear portion of the rear-group lens and the aspherical surface in a direction of intensifying the scattering function in the condition (1). However, the scattering function is added on the out-of-axis at the rear of the rear-group lens to provide a symmetrical arrangement in terms of correction for aberration whereby variation in aberration due to the near-distance focusing may be minimized to restrain occurrence of a difference in spherical aberration, coma and the like resulting from variation in image magnification of the rear-group. While the incident light on the long focal point side has a high effective height and the effect thereof is particularly great, it is effective for correction of the spherical aberration to the positive in the entire zooming zone.

The condition (2) indicates the condition of the neighbourhood of a height of the maximum on-axis light on the long focal length side of the rear of the rear-group positive lens. The range of such condition is determined from the balance between correction mainly for spherical aberration including distortion and correction of scattering comatic flare, and the on-axis length of the rear portion of the rear-group positive lens which is designed as compact as possible. The lower limit of the condition (2) is provided to obtain the effect of the aspherical surface in terms of a restriction to form the shape of the lens into compactness. When the value exceeds the lower limit to be small, the scattering function is short and the spherical aberration as well as distortion etc. are short in correction in the range of the entire focal length. Conversely, when the value exceeds the upper limit to be large, the scattering function is excessively large, and as a result, even if the on-axis length is made great sacrificing the compactness, well-balanced correction for aberrations are impossible to make.

The specific construction of the lens system described in items (3) and (4) above is provided so that in both the front and rear groups, the thickness of lens and space between lenses are made as soon as possible into compactness with the simple construction. The negative refracting power of the front-gap lens is intensified to reduce the movement amount of zoom, and the full length of lens is short on the short focal point side to reduce the diameter of the front-group lens. Under such condition, the refracting power of the positive lens arranged on the object side of the rear-group lens becomes extremely intensified.

The condition (3) is provided so that glass of large $\nu$ value is used for the positive lens having an intense refracting power to effect good chromatic correction. When the value is deviated from such condition, correction in the other portions cannot be carried out, because the construction of the lens system is simple, making it impossible to satisfactorily correct chromatic aberration for both longitudinal and lateral portions.

The condition (4) is provided to restrain the on-axis length from the rear surface of the first negative lens of the rear-group lens to the front surface of the lens arranged at the rearmost portion, and the value therefor is set to a relatively small value. Variation in spherical aberration in zooming is restrained as small as possible to correct spherical aberration while making a balance between the function of the positive lens placed between both the refractive surfaces and the function of an aspherical surface having the aforesaid scattering function, thereby correcting the image surface curvature, distortion and the like as small as possible without occurrence of variation in comatic aberration in each angle of view. When the value exceeds the upper limit to be large, not only the shape of the lens is large but negative distortion increases even if the function of the aspherical surface is intensified and correction for falling of the image surface curvature toward the negative becomes difficult to make. Conversely, when the value exceeds the lower limit to be small, the shape of the lens is small to prevent deterioration of the image surface curvature and distortion toward the negative. However, curve in spherical aberration and the scattering coma flare in a large angle of view etc. increase, making it difficult to obtain an image of large contrast.

The condition (5) is provided to reduce the refractive index of the positive lens $P_L$ in order to compensate for reduction in Petzval's sum resulting from inclusion of the negative lens in the rear portion of the rear-group lens. When the value exceeds this limit, the sagittal image surface is over relative to the meridional image surface, deteriorating the sagittal image.

BRIEF DESCRIPTION OF THE DRAWINGS

FIGS. 1, 5, 9, 13, 17, 21, 25, 29, 33, 37, 41, 45, 49, 53, 57 and 61 are sectional views of embodiments 1 to 16, respectively. FIGS. 2A-4C, 6A-8C, 10A-12C, 14A-16C, 18A-20C, 22A-24C, 26A-28C, 30A-32C, 34A-36C, 38A-40C, 42A-44C, 46A-48C, 50A-52C, 54A-56C, 58A-60C, and 62A-64C are aberration curves of the embodiments, respectively.

DETAILED DESCRIPTION OF THE PREFERRED EMBODIMENTS

Figure 3A:
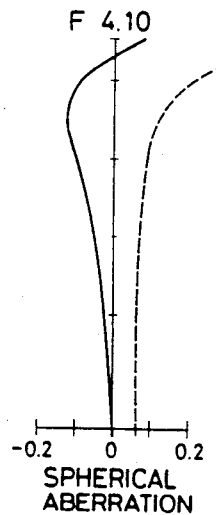
Figure 3B:
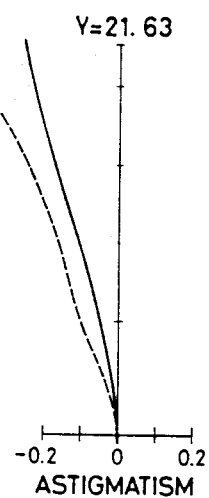
Figure 3C:
Figure 4A:
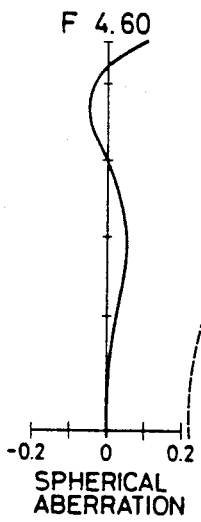
Figure 4B:
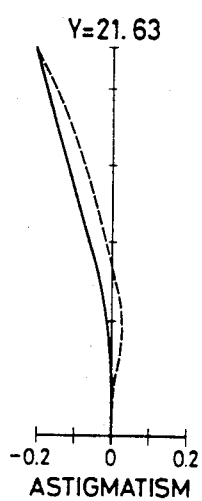
Figure 4C:
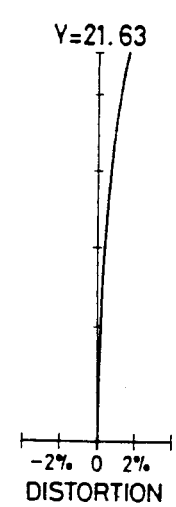
Figure 5:
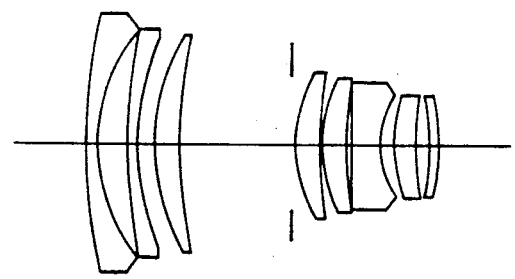
Figure 6A:
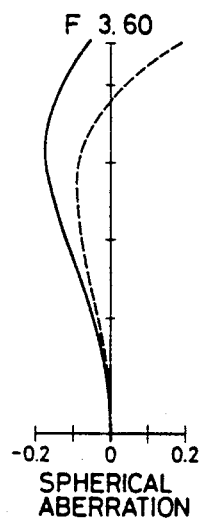
Figure 6B:
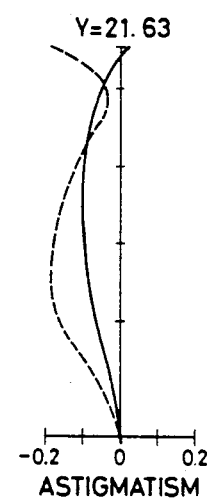
Figure 6C:
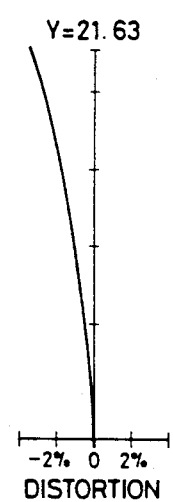
Figure 7A:
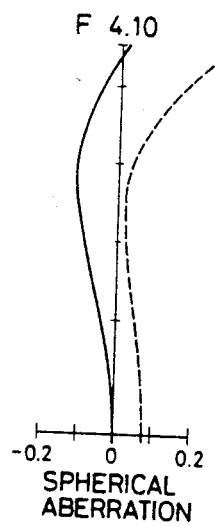
Figure 7B:
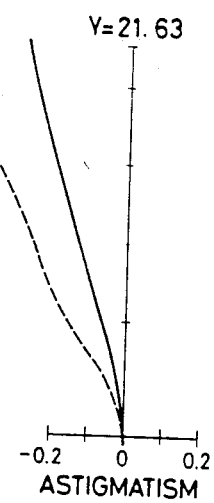
Figure 7C:
Figure 8A:
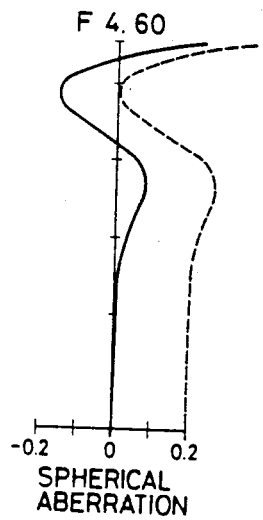
Figure 8B:
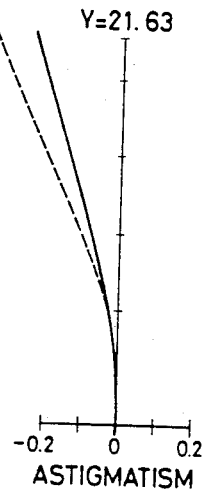
Figure 8C:
Figure 11A:
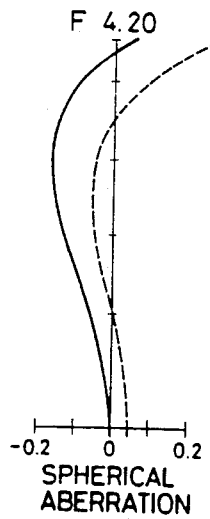
Figure 11B:
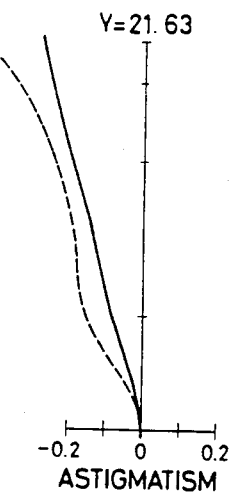
Figure 11C:
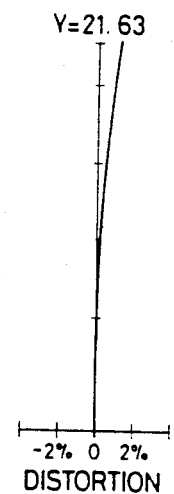
Figure 12A:
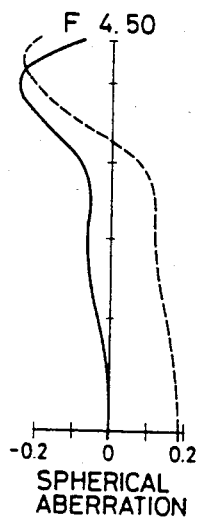
Figure 12B:
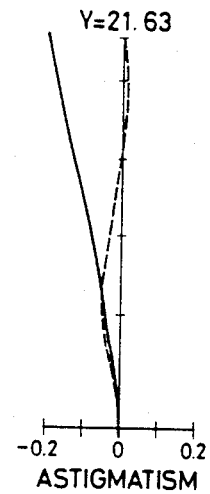
Figure 12C:
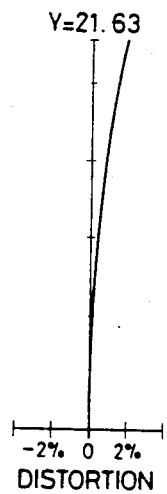
Figure 13:
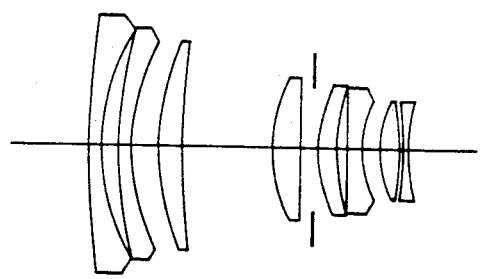
Figure 14A:
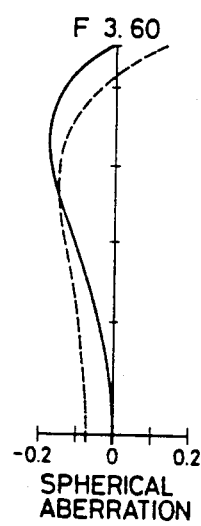
Figure 14B:
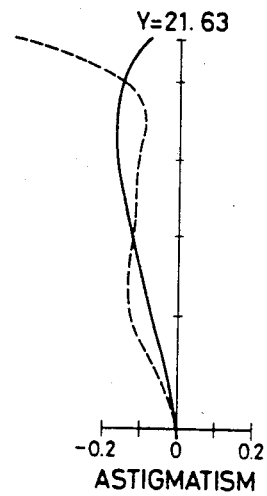
Figure 14C:
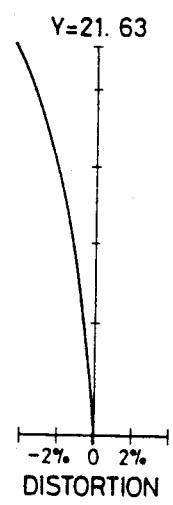
Figure 19A:
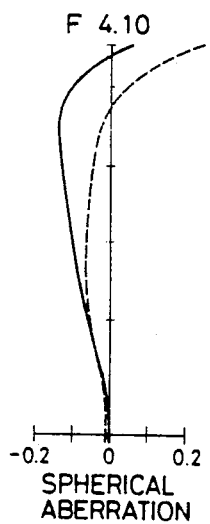
Figure 19B:
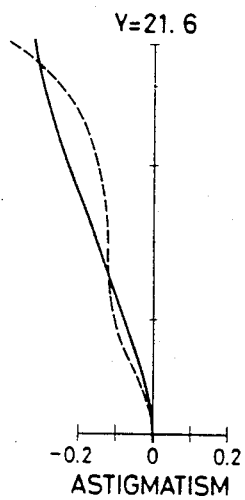
Figure 19C:
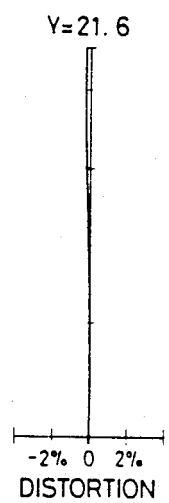
Figure 20A:
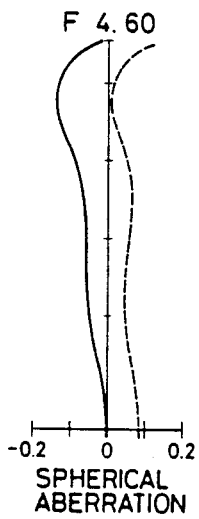
Figure 20B:
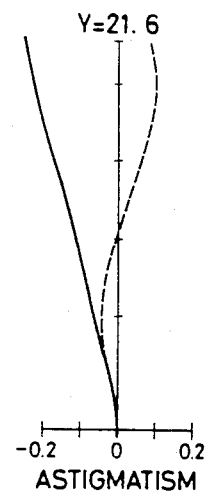
Figure 20C:
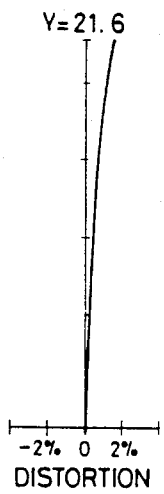
Figure 25:
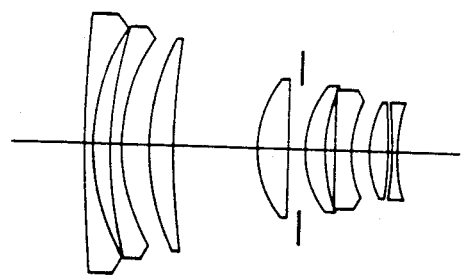
Figure 26A:
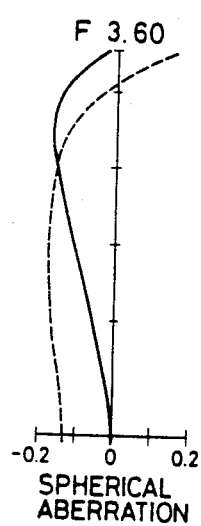
Figure 26B:
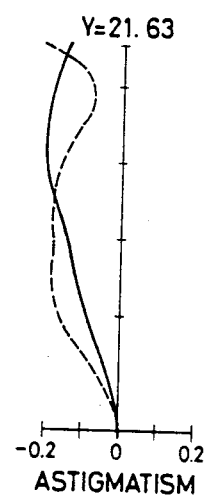
Figure 26C:
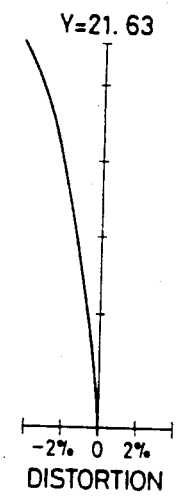
Figure 27A:
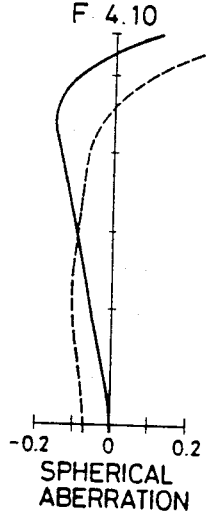
Figure 27B:
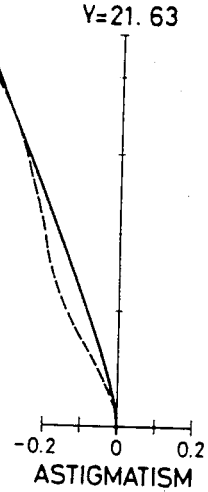
Figure 27B:
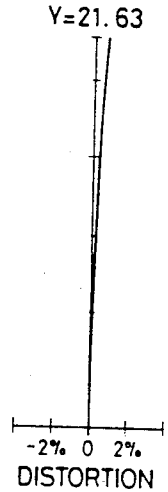
Figure 28A:
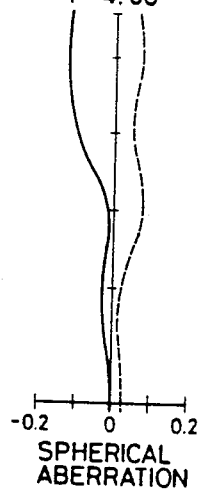
Figure 28B:
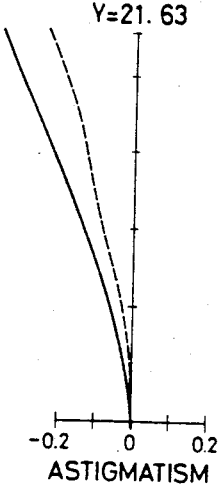
Figure 28C:
Figure 33:
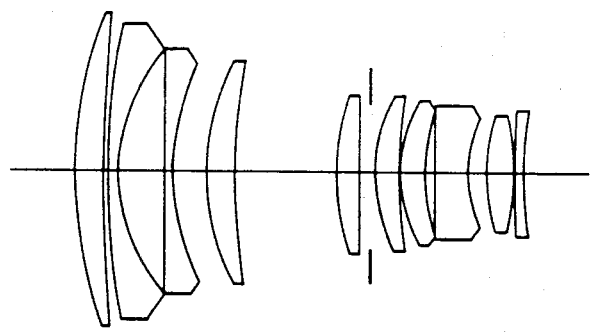
Figure 34A:
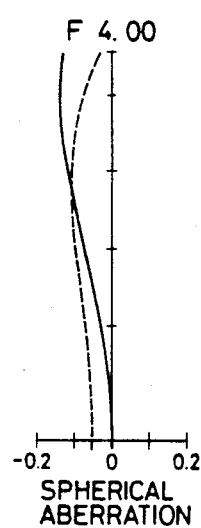
Figure 34B:
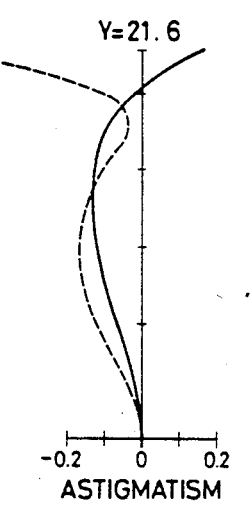
Figure 34C:
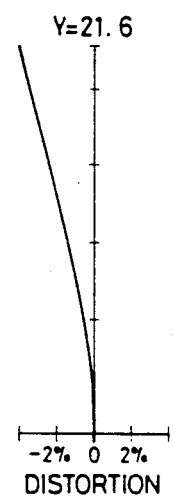
Figure 35A:
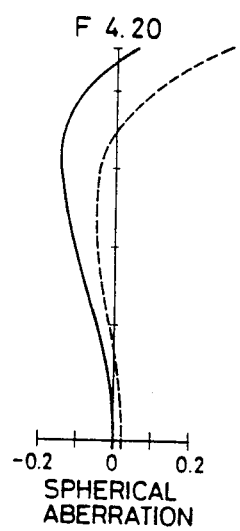
Figure 35B:
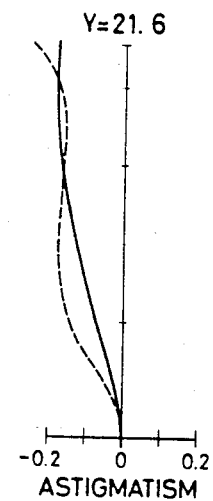
Figure 35C:
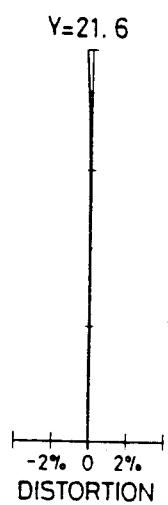
Figure 36A:
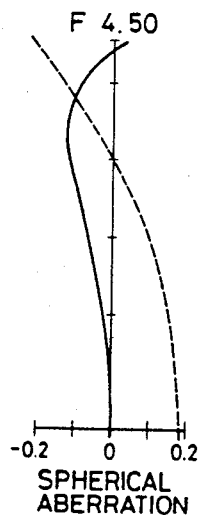
Figure 36B:
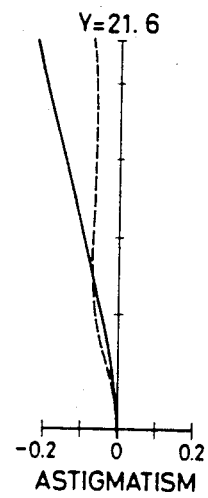
Figure 36C:
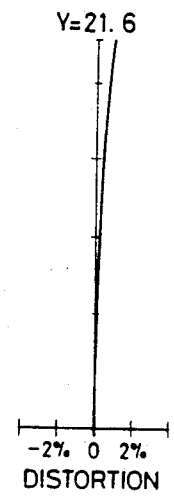
Figure 39A:
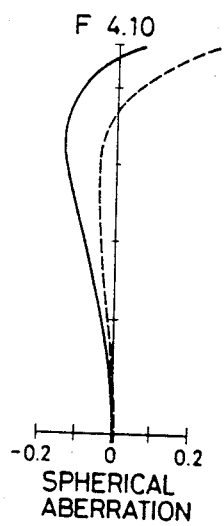
Figure 39B:
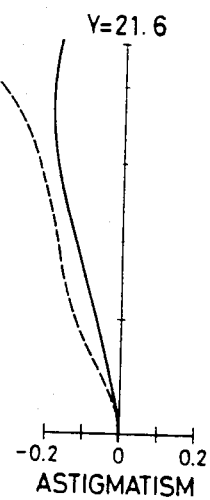
Figure 39C:
Figure 40A:
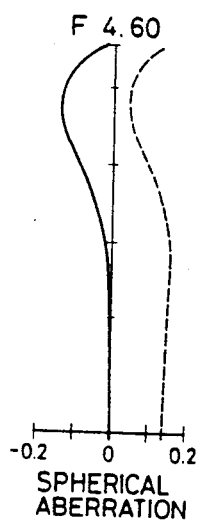
Figure 40B:
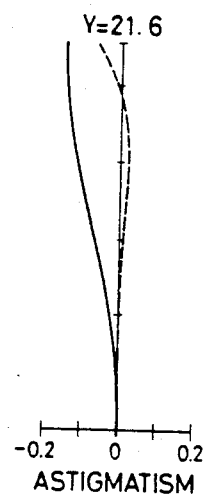
Figure 40C:
Figure 41:
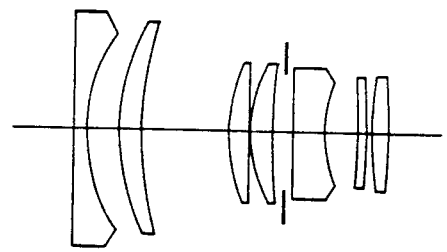
Figure 42A:
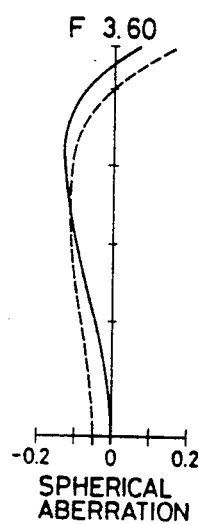
Figure 42B:
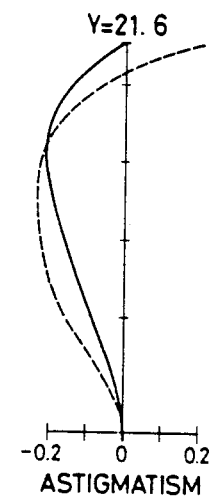
Figure 42C:
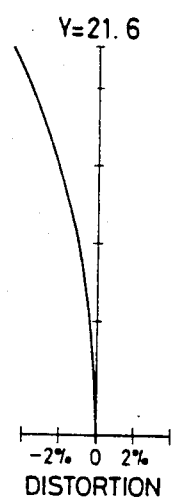
Figure 43A:
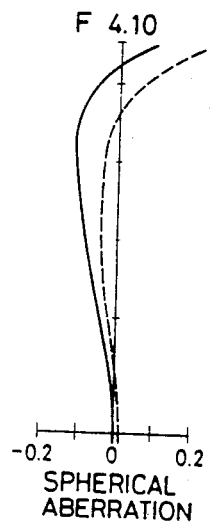
Figure 43B:
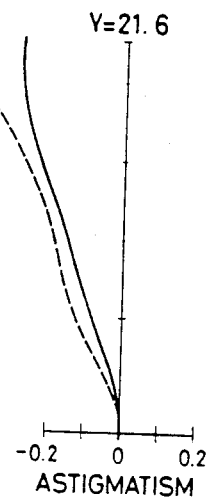
Figure 43C:
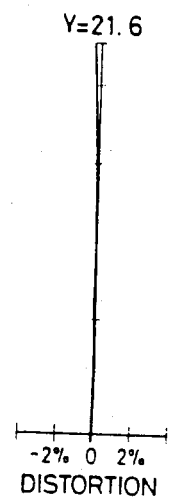
Figure 44A:
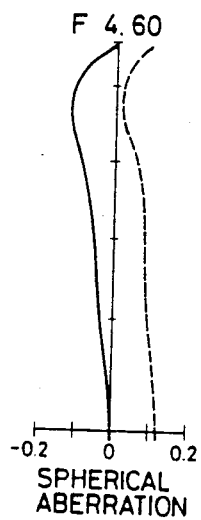
Figure 44B:
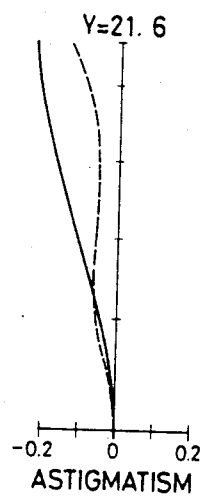
Figure 44C:
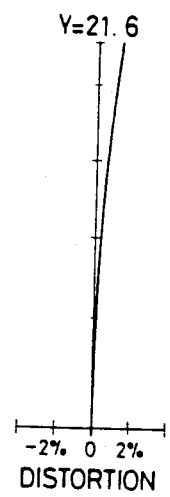
Figure 45:
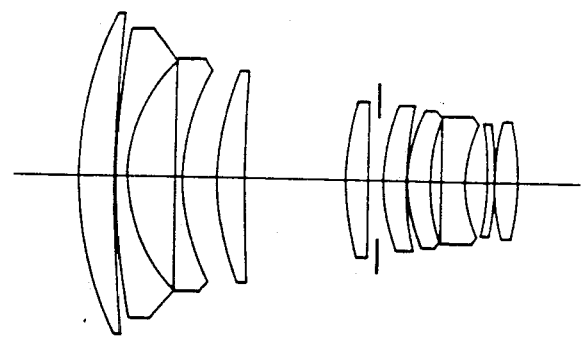
Figure 46A:
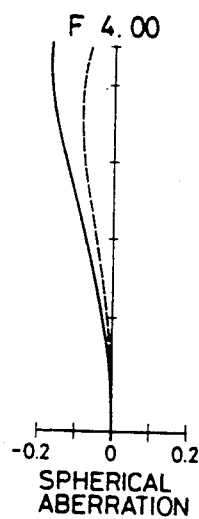
Figure 46B:
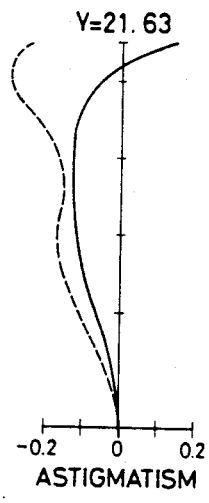
Figure 46C:
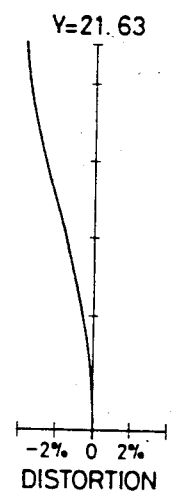
Figure 47A:
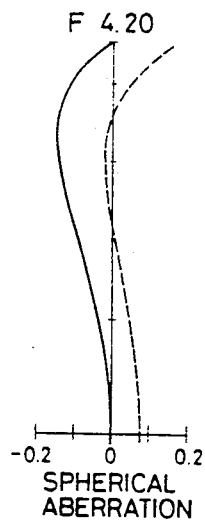
Figure 47B:
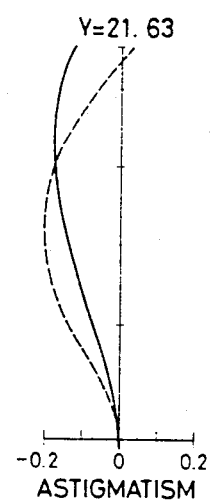
Figure 47C:
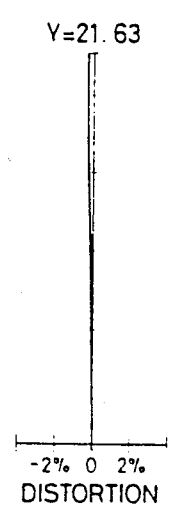
Figure 48A:
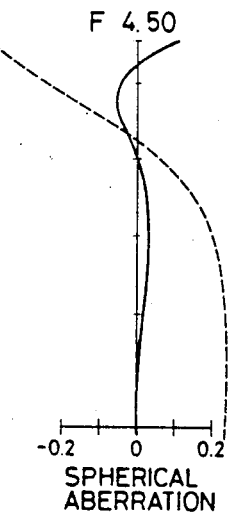
Figure 48B:
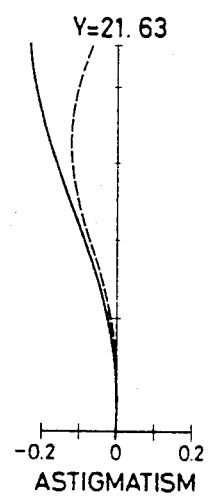
Figure 48C:
Figure 51A:
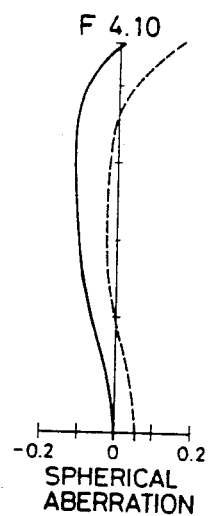
Figure 51B:
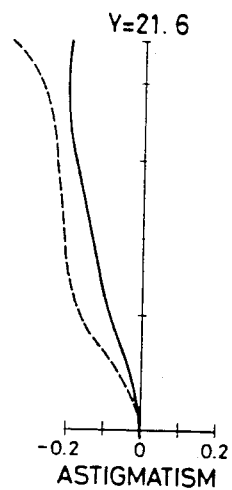
Figure 51C:
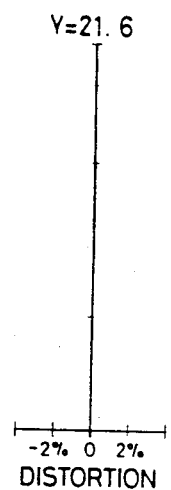
Figure 52A:
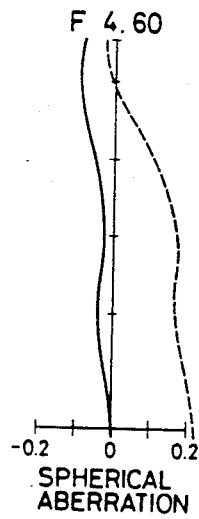
Figure 52B:
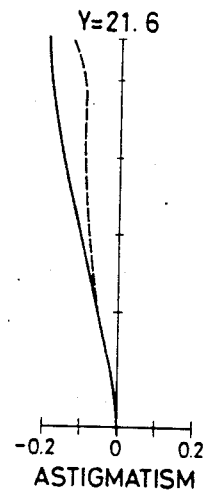
Figure 52C:
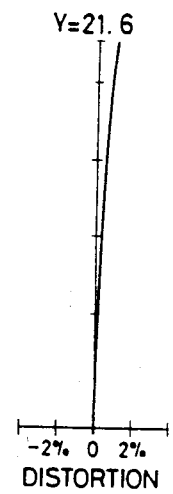
Figure 55A:
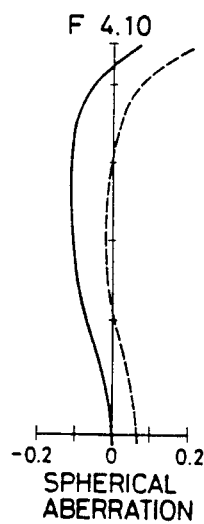
Figure 55B:
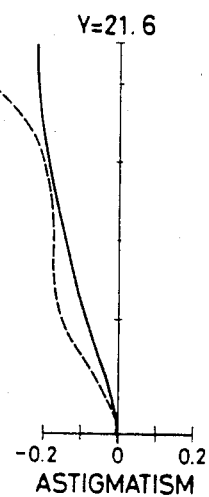
Figure 55C:
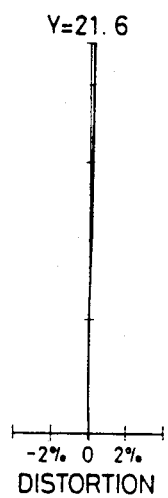
Figure 56A:
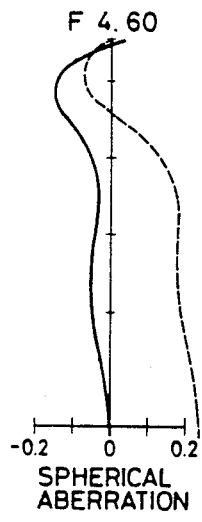
Figure 56B:
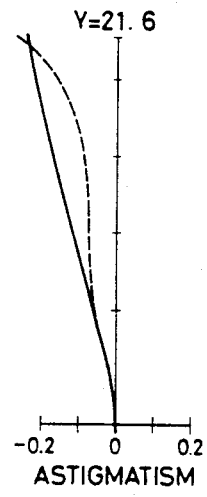
Figure 56C:
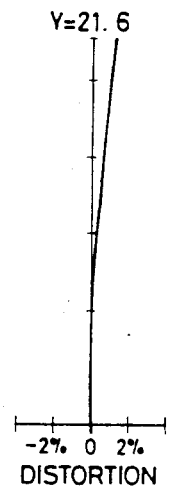
Figure 57:
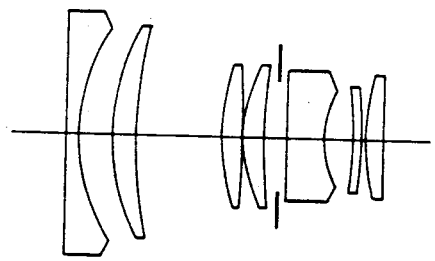
Figure 58A:
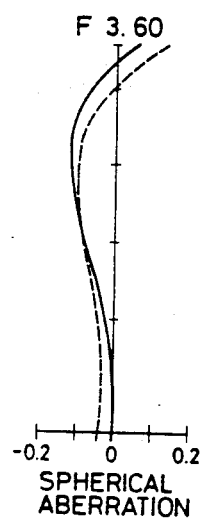
Figure 58B:
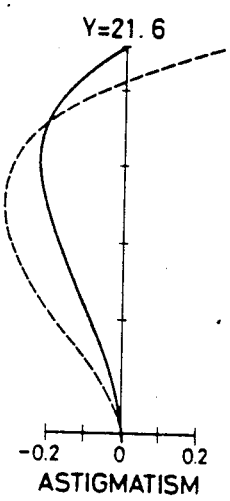
Figure 58C:
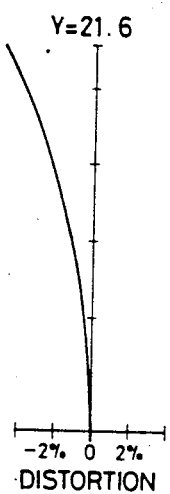
Figure 59A:
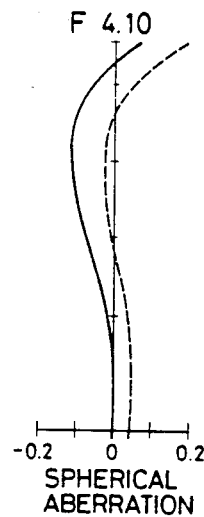
Figure 59B:
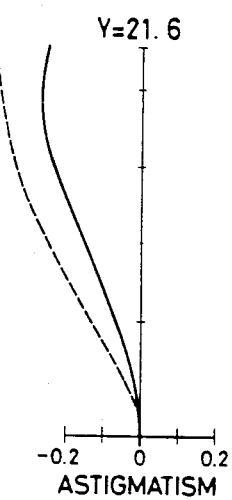
Figure 59C:
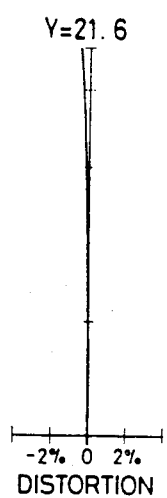
Figure 60A:
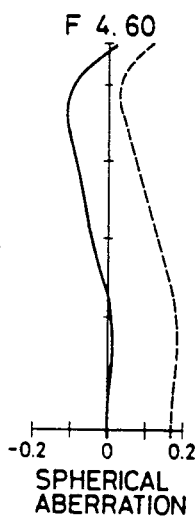
Figure 60B:
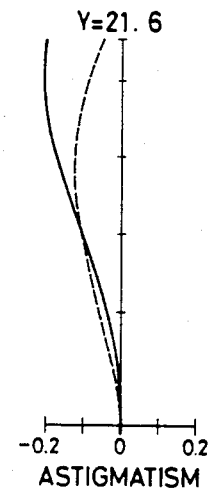
Figure 60C:
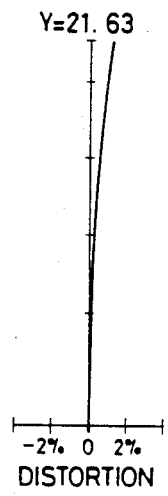

Embodiments of the zoom lens system according to the present invention will be described.

In the tables, f indicates the synthesized focal length of the entire system, $2\omega$ the angle of view, No. the number of refractive surface, R the radius of curvature of the refractive surface, d the space between the refractive surfaces, nd the refractive index, and $\nu$ the Abbe number.

Embodiments 1 to 9 are examples in which the arrayal of the rear-group lens is in order of positive and negative. Embodiments 1 to 6 are examples in which the negative lens $N_L$ at the rearmost portion is aspherical. Embodiments 7 to 9 are examples in which the positive lens $P_L$ is aspherical.

Embodiments 10 to 16 are examples in which the arrayal of the rear-group lens is in order of negative and positive. Embodiments 10 to 12 are examples in which the positive lens $P_L$ at the rearmost portion of the rear-group lens is aspherical. Embodiments 13 to 16 are examples in which the negative lens $N_L$ is aspherical.

| Embodiment 1 f = 36.2–68.4 F3.6–4.6 $2\omega$ = 63°–35° | | | | |
|---|---|---|---|---|
| No. | R | d | nd | $\nu$ |
| 1 | 106.815 | 1.40 | 1.72342 | 38.0 |
| 2 | 25.457 | 3.80 | | |
| 3 | 77.143 | 1.40 | 1.80610 | 40.9 |
| 4 | 37.320 | 3.84 | | |
| 5 | 32.607 | 3.35 | 1.80518 | 25.4 |
| 6 | 81.207 | variable | | |
| 7 | 17.614 | 4.40 | 1.60311 | 58.2 |
| 8 | 340.552 | 2.60 | | |
| 9 | 16.306 | 2.15 | 1.60311 | 64.1 |
| 10 | 27.182 | 1.26 | | |
| 11 | ∞ | 2.61 | 1.80518 | 25.4 |
| 12 | 13.395 | 1.81 | | |
| 13 | 18.812 | 2.20 | 1.72825 | 28.5 |
| 14 | 79.989 | 2.32 | | |
| 15 | −39.999 | 1.50 | 1.49200 | 55.0 |
| 16 | −46.261 | | | |

| Coefficient of aspherical surface | | | |
|---|---|---|---|
| 15 | | | |
| K = | 1.19130D+01 | | |
| A1 = | −5.34554D−06 | P1 = | 4.0000 |
| A2 = | 1.29474D−07 | P2 = | 6.0000 |
| A3 = | 4.79449D−09 | P3 = | 8.0000 |
| A4 = | −2.38673D−11 | P4 = | 10.0000 |
| A5 = | −1.51968D−12 | P5 = | 12.0000 |
| 16 | | | |
| K = | −1.03895D+01 | | |
| A1 = | 1.45718D−05 | P1 = | 4.0000 |
| A2 = | 2.65472D−07 | P2 = | 6.0000 |
| A3 = | −2.35655D−09 | P3 = | 8.0000 |
| A4 = | 2.41081D−10 | P4 = | 10.0000 |
| A5 = | −3.72472D−12 | P5 = | 12.0000 | where the d-variable and backfocus $f_B$ are the following values according to the focal length.

| | W-P | M-P | T-P |
|---|---|---|---|
| f | 36.22 | 50.52 | 68.38 |
| d-variable | 31.43 | 13.00 | 0.80 |
| fB | 38.61 | 47.03 | 57.55 |
| fI = | −63.30 | | |
| fII = | 37.27 | | |

Total of displacement from the spherical surface in $\phi=0.16$ fII of the aspherical lens
$\Delta X = -2.19 \times 10^{-3}$ fII

Embodiment 2
f = 36.2–68.4  F3.6–4.6  2ω = 63°–35°

| No. | R | d | nd | ν |
|---|---|---|---|---|
| 1 | 88.271 | 1.40 | 1.72342 | 38.0 |
| 2 | 23.622 | 4.30 | | |
| 3 | 67.232 | 1.40 | 1.80610 | 40.9 |
| 4 | 35.092 | 2.40 | | |
| 5 | 28.985 | 3.90 | 1.80518 | 25.4 |
| 6 | 68.901 | variable | | |
| 7 | 18.155 | 3.90 | 1.62299 | 58.2 |
| 8 | 85.686 | 0.20 | | |
| 9 | 19.335 | 3.60 | 1.51633 | 64.1 |
| 10 | 59.140 | 0.40 | | |
| 11 | 111.728 | 4.50 | 1.80518 | 25.4 |
| 12 | 12.753 | 1.60 | | |
| 13 | 16.168 | 3.50 | 1.72825 | 28.5 |
| 14 | 37.823 | 2.10 | | |
| 15 | −39.999 | 1.50 | 1.49200 | 55.0 |
| 16 | −46.267 | | | |

Coefficient of aspherical surface

15
K = 2.75664D+01
A1 = −2.97864D−05  P1 = 4.0000
A2 = 5.19308D−07  P2 = 6.0000
A3 = 1.00146D−08  P3 = 8.0000
A4 = 5.50329D−12  P4 = 10.0000
A5 = 3.81699D−12  P5 = 12.0000

16
K = 6.08956D+00
A1 = −5.76320D−06  P1 = 4.0000
A2 = 3.61046D−07  P2 = 6.0000
A3 = −3.85500D−09  P3 = 8.0000
A4 = 3.49243D−10  P4 = 10.0000
A5 = −4.24563D−12  P5 = 12.0000 where the d-variable and backfocus $f_B$ are the following values according to the focal length.

| | W-P | M-P | T-P |
|---|---|---|---|
| f | 36.21 | 51.17 | 68.38 |
| d-variable | 36.61 | 16.96 | 4.99 |
| fB | 38.64 | 47.31 | 57.27 | fI = −64.84
fII = 37.55

Total of displacement from the spherical surface in $\phi=0.16$ fII of the aspherical lens
$\Delta X = -2.76 \times 10^{-3}$ fII

Embodiment 3
f = 36.0–68.2  F4.0–4.5  2ω = 63°–35°

| No. | R | d | nd | ν |
|---|---|---|---|---|
| 1 | 102.928 | 1.58 | 1.72342 | 38.0 |
| 2 | 21.673 | 4.20 | | |
| 3 | 77.769 | 1.30 | 1.77250 | 49.6 |
| 4 | 41.343 | 2.46 | | |
| 5 | 28.543 | 3.00 | 1.80518 | 25.4 |
| 6 | 63.422 | variable | | |
| 7 | 18.847 | 3.40 | 1.58913 | 61.0 |
| 8 | 289.176 | 2.00 | | |
| 9 | 15.849 | 3.10 | 1.58913 | 61.0 |
| 10 | 30.532 | 1.00 | | |
| 11 | 119.937 | 2.77 | 1.80518 | 25.4 |
| 12 | 13.120 | 2.00 | | |
| 13 | 19.607 | 2.66 | 1.67270 | 32.1 |
| 14 | 127.394 | 3.13 | | |
| 15 | −48.128 | 1.50 | 1.49200 | 55.0 |
| 16 | −90.852 | | | |

Embodiment 3 —continued
f = 36.0–68.2  F4.0–4.5  2ω = 63°–35°

Coefficient of aspherical surface

15
K = 3.66089D+01
A1 = −6.92527D−06  P1 = 4.0000
A2 = 4.90000D−12  P2 = 6.0000
A3 = 1.00873D−10  P3 = 8.0000
A4 = −8.08702D−13  P4 = 10.0000
A5 = 1.78098D−12  P5 = 12.0000

16
K = −2.30781D+01
A1 = 4.36914D−06  P1 = 4.0000
A2 = −7.30000D−12  P2 = 6.0000
A3 = −5.53275D−09  P3 = 8.0000
A4 = 5.45593D−13  P4 = 12.0000 where the d-variable and backfocus $f_B$ are the following values according to the focal length.

| | W-P | M-P | T-P |
|---|---|---|---|
| f | 36.00 | 49.86 | 68.19 |
| d-variable | 26.32 | 11.00 | 0.30 |
| fB | 36.07 | 44.37 | 55.36 | fI = −57.54
fII = 34.50

Total of displacement from the spherical surface in $\phi=0.16$ fII of the aspherical lens
$\Delta X = -1.73 \times 10^{-3}$ fII

Embodiment 4
f = 36.2–68.0  F3.6–4.6  2ω = 64°–35°

| No. | R | d | nd | ν |
|---|---|---|---|---|
| 1 | 172.701 | 1.50 | 1.72342 | 38.0 |
| 2 | 28.754 | 2.70 | | |
| 3 | 61.376 | 1.40 | 1.80610 | 40.9 |
| 4 | 30.165 | 4.00 | | |
| 5 | 31.493 | 3.50 | 1.80518 | 25.4 |
| 6 | 84.760 | variable | | |
| 7 | 18.190 | 4.30 | 1.58193 | 61.0 |
| 8 | 275.556 | 2.40 | | |
| 9 | 15.885 | 3.00 | 1.58913 | 61.0 |
| 10 | 25.604 | 1.30 | | |
| 11 | 374.624 | 2.50 | 1.80518 | 25.4 |
| 12 | 14.424 | 2.80 | | |
| 13 | 17.860 | 2.70 | 1.62588 | 35.7 |
| 14 | −113.902 | 0.40 | | |
| 15 | −273.101 | 1.00 | 1.67003 | 47.3 |
| 16 | 47.839 | | | |

Coefficient of aspherical surface

15
K = 5.29100D+00
A1 = −1.36060D−05  P1 = 4.0000
A2 = −1.32280D−06  P2 = 5.0000
A3 = −1.78923D−07  P3 = 6.0000
A4 = −2.02660D−08  P4 = 7.0000
A5 = −1.43260D−09  P5 = 8.0000
A6 = 3.13690D−13  A6 = 9.0000
A7 = 1.67136D−11  A7 = 10.0000
A8 = 2.60131D−14  P8 = 12.0000

16
K = 3.22787D+01
A1 = 7.54630D−06  P1 = 4.0000
A2 = −1.65240D−06  P2 = 5.0000
A3 = −2.77550D−07  P3 = 6.0000
A4 = −2.52540D−08  P4 = 7.0000
A5 = −1.62510D−09  P5 = 8.0000
A6 = −8.89970D−11  P6 = 9.0000
A7 = −1.05050D−11  P7 = 10.0000

-continued

Embodiment 4
f = 36.2–68.0  F3.6–4.6  2ω = 64°–35°

| A8 = | −6.98580D−13 | P8 = | 12.0000 | where the d-variable and backfocus $f_B$ are the following values according to the focal length.

|  | W-P | M-P | T-P |
|---|---|---|---|
| f | 36.23 | 51.26 | 68.00 |
| d-variable | 30.00 | 11.80 | 1.00 |
| fB | 38.51 | 47.31 | 57.12 | fI = −61.95
fII = 36.30

Total of displacement from the spherical surface in $\phi=0.16$ fII of the aspherical lens
$\Delta X = -1.96 \times 10^{-03}$ fII

Embodiment 5
f = 41.5–71.0  F3.6–4.6  2ω = 57°–33.4°

| No. | R | d | nd | ν |
|---|---|---|---|---|
| 1 | 1976.553 | 1.60 | 1.71700 | 47.9 |
| 2 | 24.440 | 5.01 | | |
| 3 | 28.903 | 3.50 | 1.71736 | 29.5 |
| 4 | 59.106 | variable | | |
| 5 | 27.119 | 3.00 | 1.60311 | 60.7 |
| 6 | −235.468 | 0.20 | | |
| 7 | 21.552 | 3.00 | 1.60311 | 60.7 |
| 8 | 80.994 | 3.00 | | |
| 9 | −355.423 | 6.52 | 1.80518 | 25.4 |
| 10 | 15.666 | 3.23 | | |
| 11 | 31.075 | 2.50 | 1.67270 | 32.1 |
| 12 | −52.591 | 0.46 | | |
| 13 | −33.592 | 1.00 | 1.67003 | 47.3 |
| 14 | −74.622 | | | |

Coefficient of aspherical surface

15

| K = | −5.03475D+01 | | |
|---|---|---|---|
| A1 = | −3.35976D−05 | P1 = | 4.0000 |
| A2 = | 1.39115D−06 | P2 = | 5.0000 |
| A3 = | 3.54187D−07 | P3 = | 6.0000 |
| A4 = | 1.51775D−08 | P4 = | 7.0000 |
| A5 = | −3.00018D−09 | P5 = | 8.0000 |
| A6 = | −7.35689D−10 | P6 = | 9.0000 |
| A7 = | −8.81076D−11 | P7 = | 10.0000 |
| A8 = | 4.96835D−12 | P8 = | 11.0000 |
| A9 = | 1.03000D−12 | P9 = | 12.0000 |

14

| K = | −3.21565D+02 | | |
|---|---|---|---|
| A1 = | 3.77064D−05 | P1 = | 4.0000 |
| A2 = | 1.88470D−06 | P2 = | 5.0000 |
| A3 = | −1.51047D−07 | P3 = | 6.0000 |
| A4 = | −2.80710D−08 | P4 = | 7.0000 |
| A5 = | −1.84619D−09 | P5 = | 8.0000 |
| A6 = | −1.63467D−11 | P6 = | 9.0000 |
| A7 = | 6.37356D−12 | P7 = | 10.0000 |
| A8 = | −2.69814D−12 | P8 = | 11.0000 |
| A9 = | 4.22031D−13 | P9 = | 12.0000 | where the d-variable and backfocus $f_B$ are the following values according to the focal length.

|  | W-P | M-P | T-P |
|---|---|---|---|
| f | 41.56 | 53.88 | 71.00 |
| d-variable | 27.10 | 12.70 | 1.00 |
| fB | 39.89 | 46.63 | 55.99 | fI = −69.16
fII = 37.82

Total of displacement from the spherical surface in $\phi=0.16$ fII of the aspherical lens
$\Delta X = -2.57 \times 10^{-04}$ fII

Embodiment 6
f = 28.8–68.4  F4.0–4.5  2ω = 76°–35°

| No. | R | d | nd | ν |
|---|---|---|---|---|
| 1 | 76.642 | 4.30 | 1.58913 | 61.0 |
| 2 | 260.226 | 0.20 | | |
| 3 | 76.908 | 1.80 | 1.83400 | 37.2 |
| 4 | 22.513 | 6.60 | | |
| 5 | 8999.654 | 1.40 | 1.71300 | 53.8 |
| 6 | 34.871 | 4.97 | | |
| 7 | 36.119 | 4.30 | 1.80518 | 25.4 |
| 8 | 133.249 | variable | | |
| 9 | 27.418 | 3.40 | 1.61272 | 58.7 |
| 10 | 117.122 | 2.30 | | |
| 11 | 23.889 | 3.40 | 1.60311 | 60.7 |
| 12 | 44.828 | 0.20 | | |
| 13 | 21.648 | 3.40 | 1.60311 | 60.7 |
| 14 | 35.021 | 1.00 | | |
| 15 | 161.515 | 4.00 | 1.84666 | 23.8 |
| 16 | 16.010 | 2.68 | | |
| 17 | 24.944 | 3.90 | 1.62004 | 36.3 |
| 18 | −59.545 | 1.90 | | |
| 19 | −94.452 | 1.50 | 1.80440 | 39.6 |
| 20 | 1450.654 | | | |

Coefficient of aspherical surface

19

| K = | −5.96686D+01 | | |
|---|---|---|---|
| A1 = | −3.98098D−06 | P1 = | 4.0000 |
| A2 = | −7.66004D−08 | P2 = | 6.0000 |
| A3 = | −5.65091D−10 | P3 = | 8.0000 |
| A4 = | −1.09887D−11 | P4 = | 10.0000 |
| A5 = | 7.38007D−14 | P5 = | 12.0000 |

20

| K = | −8.22236D+00 | | |
|---|---|---|---|
| A1 = | 2.38031D−05 | P1 = | 4.0000 |
| A2 = | −5.63324D−08 | P2 = | 6.0000 |
| A3 = | −1.24439D−09 | P3 = | 8.0000 |
| A4 = | −7.39359D−12 | P4 = | 10.0000 |
| A5 = | −4.08079D−14 | P5 = | 12.0000 | where the d-variable and backfocus $f_B$ are the following values according to the focal length.

|  | W-P | M-P | T-P |
|---|---|---|---|
| f | 28.84 | 43.81 | 68.38 |
| d-variable | 35.52 | 15.00 | 0.80 |
| fB | 36.17 | 47.52 | 66.13 | fI = −47.81
fII = 36.22

Total of displacement from the spherical surface in $\phi=0.16$ fII of the aspherical lens
$\Delta X = -6.33 \times 10^{-4}$ fII

Embodiment 7
f = 36.2–68.0  F3.6–4.6  2ω = 64°–35°

| No. | R | d | nd | ν |
|---|---|---|---|---|
| 1 | 188.148 | 1.50 | 1.72342 | 38.0 |
| 2 | 30.153 | 2.70 | | |
| 3 | 58.962 | 1.40 | 1.80610 | 40.9 |
| 4 | 28.402 | 4.00 | | |
| 5 | 30.721 | 3.50 | 1.78470 | 26.2 |
| 6 | 85.465 | variable | | |
| 7 | 18.469 | 4.30 | 1.58913 | 61.0 |
| 8 | 453.029 | 2.40 | | |
| 9 | 15.966 | 3.00 | 1.58913 | 61.0 |
| 10 | 26.084 | 1.30 | | |
| 11 | 420.323 | 2.50 | 1.80518 | 25.4 |
| 12 | 14.719 | 2.80 | | |
| 13 | 18.365 | 2.70 | 1.56700 | 34.0 |

Embodiment 7
f = 36.2–68.0  F3.6–4.6  2ω = 64°–35°

| | | | | |
|---|---|---|---|---|
| 14 | −67.124 | 0.40 | | |
| 15 | −205.437 | 1.00 | 1.56732 | 42.8 |
| 16 | 41.245 | | | |

Coefficient of aspherical surface

13
| | | | | |
|---|---|---|---|---|
| K = | 3.21652D+00 | | | |
| A1 = | −4.39730D−05 | P1 = | 4.0000 | |
| A2 = | −3.12750D−06 | P2 = | 5.0000 | |
| A3 = | −1.91830D−07 | P3 = | 6.0000 | |
| A4 = | −8.43320D−09 | P4 = | 7.0000 | |
| A5 = | 8.95910D−11 | P5 = | 8.0000 | |
| A6 = | 9.32580D−11 | P6 = | 9.0000 | |
| A7 = | 1.87920D−11 | P7 = | 10.0000 | |
| A8 = | 1.00000D−19 | P8 = | 11.0000 | |
| A9 = | 6.18370D−13 | P9 = | 12.0000 | |

14
| | | | | |
|---|---|---|---|---|
| K = | −1.38155D+02 | | | |
| A1 = | 2.04410D−05 | P1 = | 4.0000 | |
| A2 = | 1.75005D−06 | P2 = | 5.0000 | |
| A3 = | 1.73280D−07 | P3 = | 6.0000 | |
| A4 = | 2.02538D−08 | P4 = | 7.0000 | |
| A5 = | 2.80700D−09 | P5 = | 8.0000 | |
| A6 = | 4.27970D−10 | P6 = | 9.0000 | |
| A7 = | 6.58760D−11 | P7 = | 10.0000 | |
| A8 = | 1.00000D−19 | P8 = | 11.0000 | |
| A9 = | 1.37214D−12 | P9 = | 12.0000 | | where the d-variable and backfocus $f_B$ are the following values according to the focal length.

| | W-P | M-P | T-P |
|---|---|---|---|
| f | 36.21 | 51.24 | 68.00 |
| d-variable | 30.00 | 11.80 | 1.00 |
| fB | 38.29 | 47.09 | 56.90 |

$$f_I = -61.95$$
$$f_{II} = 36.25$$

Total of displacement from the spherical surface in $\phi = 0.16\, f_{II}$ of the aspherical lens
$$\Delta X = -2.16 \times 10^{-03}\, f_{II}$$

Embodiment 8
f = 42.0–72.0  F3.6–4.6  2ω = 57°–33°

| No. | R | d | nd | ν |
|---|---|---|---|---|
| 1 | ∞ | 1.60 | 1.71700 | 47.9 |
| 2 | 25.633 | 4.97 | | |
| 3 | 30.137 | 3.50 | 1.71736 | 29.5 |
| 4 | 62.261 | variable | | |
| 5 | 27.946 | 3.00 | 1.60311 | 60.7 |
| 6 | −226.127 | 0.20 | | |
| 7 | 19.624 | 3.00 | 1.60311 | 60.7 |
| 8 | 61.307 | 3.00 | | |
| 9 | 762.310 | 5.50 | 1.80518 | 25.4 |
| 10 | 15.329 | 4.46 | | |
| 11 | 31.437 | 2.50 | 1.67270 | 32.1 |
| 12 | −68.352 | 0.56 | | |
| 13 | −64.657 | 1.00 | 1.67003 | 47.3 |
| 14 | 1038.338 | | | |

Coefficient of aspherical surface

11
| | | | | |
|---|---|---|---|---|
| K = | 1.13884D+01 | | | |
| A1 = | −1.08283D−05 | P1 = | 4.0000 | |
| A2 = | −1.30588D−06 | P2 = | 5.0000 | |
| A3 = | −1.85365D−07 | P3 = | 6.0000 | |
| A4 = | −6.87096D−09 | P4 = | 7.0000 | |
| A5 = | 2.30748D−09 | P5 = | 8.0000 | |
| A6 = | 5.40297D−10 | P6 = | 9.0000 | |
| A7 = | −3.41406D−11 | P7 = | 10.0000 | |
| A8 = | 3.01090D−12 | P8 = | 11.0000 | |
| A9 = | −1.12265D−12 | P9 = | 12.0000 | |

12
| | | | | |
|---|---|---|---|---|
| K = | −9.76615D+01 | | | |
| A1 = | 5.08325D−06 | P1 = | 4.0000 | |
| A2 = | 4.24355D−07 | P2 = | 5.0000 | |
| A3 = | 1.43812D−07 | P3 = | 6.0000 | |
| A4 = | 2.40718D−08 | P4 = | 7.0000 | |
| A5 = | 2.64234D−09 | P5 = | 8.0000 | |
| A6 = | 2.01226D−10 | P6 = | 9.0000 | |
| A7 = | 1.51836D−11 | P7 = | 10.0000 | |
| A8 = | −2.91290D−12 | P8 = | 11.0000 | |
| A9 = | 3.07268D−13 | P9 = | 12.0000 | | where the d-variable and backfocus $f_B$ are the following values according to the focal length.

| | W-P | M-P | T-P |
|---|---|---|---|
| f | 42.00 | 55.11 | 72.00 |
| d-variable | 28.30 | 12.70 | 1.00 |
| fB | 39.55 | 46.63 | 55.74 |

$$f_I = -71.38$$
$$f_{II} = 38.51$$

Total of displacement from the spherical surface in $\phi = 0.16\, f_{II}$ of the aspherical lens
$$\Delta X = -4.85 \times 10^{-04}\, f_{II}$$

Embodiment 9
f = 28.8–68.0  F4–4.5  2ω = 76°–35°

| No. | R | d | nd | ν |
|---|---|---|---|---|
| 1 | 59.102 | 4.30 | 1.61272 | 58.7 |
| 2 | 264.644 | 0.20 | | |
| 3 | 110.995 | 1.80 | 1.83400 | 37.2 |
| 4 | 23.387 | 6.60 | | |
| 5 | 472.720 | 1.40 | 1.69680 | 55.5 |
| 6 | 32.934 | 5.00 | | |
| 7 | 34.607 | 4.10 | 1.80518 | 25.4 |
| 8 | 104.307 | variable | | |
| 9 | 32.633 | 3.20 | 1.62299 | 58.2 |
| 10 | 347.297 | 2.30 | | |
| 11 | 24.680 | 3.60 | 1.60311 | 60.7 |
| 12 | 43.893 | 0.20 | | |
| 13 | 20.309 | 3.60 | 1.60311 | 60.7 |
| 14 | 28.551 | 1.20 | | |
| 15 | 136.311 | 5.00 | 1.84666 | 23.8 |
| 16 | 15.805 | 2.70 | | |
| 17 | 24.914 | 3.80 | 1.60342 | 38.0 |
| 18 | −45.166 | 0.60 | | |
| 19 | −921.430 | 1.50 | 1.83400 | 37.2 |
| 20 | 100.298 | | | |

Coefficient of aspherical surface

17
| | | | | |
|---|---|---|---|---|
| K = | 1.36065D+00 | | | |
| A1 = | −2.51981D−06 | P1 = | 4.0000 | |
| A2 = | 6.45457D−08 | P2 = | 6.0000 | |
| A3 = | 1.05605D−09 | P3 = | 8.0000 | |
| A4 = | 2.11600D−11 | P4 = | 10.0000 | |
| A5 = | −1.68622D−14 | P5 = | 12.0000 | |

18
| | | | | |
|---|---|---|---|---|
| K = | −1.89215D+00 | | | |
| A1 = | 2.34200D−05 | P1 = | 4.0000 | |
| A2 = | 1.49316D−07 | P2 = | 6.0000 | |
| A3 = | 5.00217D−11 | P3 = | 8.0000 | |
| A4 = | 4.98722D−11 | P4 = | 10.0000 | |
| A5 = | −1.84178D−13 | P5 = | 12.0000 | | where the d-variable and backfocus $f_B$ are the following values according to the focal length.

|  | W-P | M-P | T-P |
|---|---|---|---|
| f | 28.82 | 44.42 | 68.00 |
| d-variable | 36.86 | 47.58 | 1.00 |
| fB | 36.10 | 15.00 | 64.95 | fI = −49.35
fII = 36.34

Total of displacement from the spherical surface in $\phi=0.16$ fII of the aspherical lens
$\Delta X = -5.92 \times 10^{-04}$ fII

Embodiment 10
f = 36.2–68.3  F3.6–4.6  2ω = 64°–35°

| No. | R | d | nd | ν |
|---|---|---|---|---|
| 1 | 103.436 | 1.40 | 1.72000 | 43.7 |
| 2 | 27.458 | 2.40 | | |
| 3 | 41.297 | 1.40 | 1.77250 | 49.6 |
| 4 | 28.486 | 5.00 | | |
| 5 | 28.107 | 3.80 | 1.78470 | 26.2 |
| 6 | 44.853 | variable | | |
| 7 | 21.420 | 4.00 | 1.60311 | 60.7 |
| 8 | 271.015 | 2.60 | | |
| 9 | 18.748 | 3.60 | 1.60311 | 60.7 |
| 10 | 52.026 | 0.70 | | |
| 11 | 200.265 | 5.50 | 1.80518 | 25.4 |
| 12 | 15.626 | 2.80 | | |
| 13 | −25.190 | 1.50 | 1.77250 | 49.6 |
| 14 | −27.423 | 0.50 | | |
| 15 | 25.729 | 2.00 | 1.67270 | 32.1 |
| 16 | 84.088 | | | |

Coefficient of aspherical surface

15
K  = −2.70009D+00
A1 = −6.89073D−07    P1 = 4.0000
A2 = −7.56256D−07    P2 = 5.0000
A3 = −1.64291D−07    P3 = 6.0000
A4 = −2.92319D−08    P4 = 7.0000
A5 = −4.19946D−09    P5 = 8.0000
A6 = −4.89686D−10    P6 = 9.0000
A7 = −4.41276D−11    P7 = 10.0000
A8 = −2.14513D−12    P8 = 11.0000
A9 = 2.53048D−13     P9 = 12.0000

16
K  = 6.47182D−01
A1 = 1.10009D−05     P1 = 4.0000
A2 = 3.10228D−08     P2 = 5.0000
A3 = −1.88608D−07    P3 = 6.0000
A4 = −3.49242D−08    P4 = 7.0000
A5 = −4.39969D−09    P5 = 8.0000
A6 = −4.18323D−10    P6 = 9.0000
A7 = −3.04360D−11    P7 = 10.0000
A8 = −7.34420D−13    P8 = 11.0000
A9 = 3.14590D−13     P9 = 12.0000 where the d-variable and backfocus $f_B$ are the following values according to the focal length.

|  | W-P | M-P | T-P |
|---|---|---|---|
| f | 36.21 | 49.88 | 68.30 |
| d-variable | 32.00 | 13.80 | 0.80 |
| fB | 37.64 | 45.41 | 55.89 | fI = −65.03
fII = 36.98

Total of displacement from the spherical surface in $\phi=0.16$ fII of the aspherical lens
$\Delta X = -1.16 \times 10^{-3}$ fII

Embodiment 11
f = 42.0–72.0  F3.6–4.6  2ω = 57°–33°

| No. | R | d | nd | ν |
|---|---|---|---|---|
| 1 | 1291.128 | 1.60 | 1.71700 | 47.9 |
| 2 | 25.142 | 4.83 | | |
| 3 | 29.222 | 3.50 | 1.71736 | 29.5 |
| 4 | 58.469 | variable | | |
| 5 | 26.347 | 3.00 | 1.60311 | 60.7 |
| 6 | −522.955 | 0.20 | | |
| 7 | 20.203 | 3.00 | 1.60311 | 60.7 |
| 8 | 78.540 | 3.00 | | |
| 9 | 246.859 | 4.70 | 1.80518 | 25.4 |
| 10 | 16.887 | 5.32 | | |
| 11 | −68.534 | 1.20 | 1.67003 | 47.3 |
| 12 | −197.087 | 0.50 | | |
| 13 | 39.076 | 2.50 | 1.67270 | 32.1 |
| 14 | −316.710 | | | |

Coefficient of aspherical surface

13
K  = −1.78548D+01
A1 = 1.75002D−05     P1 = 4.0000
A2 = −1.76227D−06    P2 = 5.0000
A3 = −3.25276D−07    P3 = 6.0000
A4 = −2.97348D−08    P4 = 7.0000
A5 = −1.51552D−09    P5 = 8.0000
A6 = 4.18409D−11     P6 = 9.0000
A7 = 1.67705D−11     P7 = 10.0000
A8 = 1.01047D−13     P8 = 11.0000
A9 = −8.21361D−13    P9 = 12.0000

14
K  = −4.87333D+00
A1 = 1.25340D−06     P1 = 4.0000
A2 = −7.29761D−07    P2 = 5.0000
A3 = −2.26702D−07    P3 = 6.0000
A4 = −3.05027D−08    P4 = 7.0000
A5 = −2.13313D−09    P5 = 8.0000
A6 = 3.93265D−11     P6 = 9.0000
A7 = 2.98463D−11     P7 = 10.0000
A8 = 2.08242D−12     P8 = 11.0000
A9 = −8.68686D−13    P9 = 12.0000 where the d-variable and backfocus $f_B$ are the following values according to the focal length.

|  | W-P | M-P | T-P |
|---|---|---|---|
| f | 42.07 | 55.18 | 72.00 |
| d-variable | 28.30 | 12.70 | 1.00 |
| fB | 39.45 | 46.57 | 55.71 | fI = −71.32
fII = 38.75

Total of displacement from the spherical surface in $\phi=0.16$ fII of the aspherical lens
$\Delta X = -9.78 \times 10^{-04}$ fII

Embodiment 12
f = 28.9–68.2

| No. | R | d | nd | ν |
|---|---|---|---|---|
| 1 | 50.447 | 5.50 | 1.65844 | 50.9 |
| 2 | 313.607 | 0.20 | | |
| 3 | 135.143 | 1.50 | 1.83400 | 37.2 |
| 4 | 23.073 | 6.60 | | |
| 5 | −5389.690 | 1.40 | 1.77250 | 49.6 |
| 6 | 32.778 | 4.74 | | |
| 7 | 36.079 | 4.00 | 1.80518 | 25.4 |
| 8 | 163.152 | variable | | |
| 9 | 31.240 | 3.40 | 1.69680 | 55.5 |
| 10 | 222.371 | 2.30 | | |
| 11 | 25.845 | 3.40 | 1.60311 | 60.7 |
| 12 | 51.872 | 0.20 | | |
| 13 | 22.204 | 3.40 | 1.60311 | 60.7 |
| 14 | 35.317 | 1.00 | | |

-continued

Embodiment 12
f = 28.9–68.2

| | | | | |
|---|---|---|---|---|
| 15 | 148.101 | 4.00 | 1.84666 | 23.8 |
| 16 | 17.158 | 3.00 | | |
| 17 | −96.983 | 1.00 | 1.83400 | 37.2 |
| 18 | 177.227 | 0.20 | | |
| 19 | 35.328 | 3.00 | 1.60717 | 40.3 |
| 20 | −34.737 | | | |

Coefficient of aspherical surface

19

| | | | |
|---|---|---|---|
| K = | −4.02375D+00 | | |
| A1 = | −8.33622D−08 | P1 = | 4.0000 |
| A2 = | 1.78174D−09 | P2 = | 6.0000 |
| A3 = | 1.71693D−10 | P3 = | 8.0000 |
| A4 = | −7.93662D−14 | P4 = | 10.0000 |
| A5 = | −9.55653D−14 | P5 = | 12.0000 |

20

| | | | |
|---|---|---|---|
| K = | −3.02216D+00 | | |
| A1 = | 7.23038D−07 | P1 = | 4.0000 |
| A2 = | 3.88756D−08 | P2 = | 6.0000 |
| A3 = | 3.23266D−10 | P3 = | 8.0000 |
| A4 = | −2.32983D−13 | P4 = | 10.0000 |
| A5 = | −6.93752D−14 | P5 = | 12.0000 | where the d-variable and backfocus $f_B$ are the following values according to the focal length.

| | W-P | M-P | T-P |
|---|---|---|---|
| f | 28.90 | 44.37 | 68.25 |
| d-variable | 36.73 | 15.00 | 0.80 |
| fB | 39.26 | 50.95 | 68.99 |

| | |
|---|---|
| fI = | −48.82 |
| fII = | 36.89 |

Total of displacement from the spherical surface in $\phi = 0.16$ fII of the aspherical lens
$\Delta X = -7.33 \times 10^{-4}$ fII

Embodiment 13
f = 36.2–68.3  F3.6–4.6  2ω = 64°–35°

| No. | R | d | nd | ν |
|---|---|---|---|---|
| 1 | 105.572 | 1.40 | 1.72000 | 43.7 |
| 2 | 25.981 | 2.40 | | |
| 3 | 45.021 | 1.40 | 1.77250 | 49.6 |
| 4 | 30.015 | 5.00 | | |
| 5 | 28.568 | 3.20 | 1.78470 | 26.2 |
| 6 | 48.386 | variable | | |
| 7 | 19.592 | 4.00 | 1.60311 | 60.7 |
| 8 | 213.689 | 2.60 | | |
| 9 | 19.245 | 3.60 | 1.60311 | 60.7 |
| 10 | 53.724 | 0.70 | | |
| 11 | 492.523 | 4.50 | 1.80518 | 25.4 |
| 12 | 16.307 | 2.80 | | |
| 13 | −26.218 | 1.50 | 1.77250 | 49.6 |
| 14 | −29.215 | 0.20 | | |
| 15 | 26.166 | 2.00 | 1.67270 | 32.1 |
| 16 | 90.185 | | | |

Coefficient of aspherical surface

13

| | | | |
|---|---|---|---|
| K = | −7.54546D+00 | | |
| A1 = | 1.77893D−07 | P1 = | 4.0000 |
| A2 = | −2.09121D−07 | P2 = | 5.0000 |
| A3 = | 5.36071D−08 | P3 = | 6.0000 |
| A4 = | 2.19981D−08 | P4 = | 7.0000 |
| A5 = | 4.45507D−09 | P5 = | 8.0000 |
| A6 = | 6.63674D−10 | P6 = | 9.0000 |
| A7 = | 7.76937D−11 | P7 = | 10.0000 |
| A8 = | 6.54205D−12 | P8 = | 11.0000 |
| A9 = | 1.21333D−13 | P9 = | 12.0000 |

14

| | |
|---|---|
| A = | −1.43330D−01 |

-continued

Embodiment 13
f = 36.2–68.3  F3.6–4.6  2ω = 64°–35°

| | | | |
|---|---|---|---|
| A1 = | 4.53363D−06 | P1 = | 4.0000 |
| A2 = | 1.83030D−06 | P2 = | 5.0000 |
| A3 = | 2.67232D−07 | P3 = | 6.0000 |
| A4 = | 2.97545D−08 | P4 = | 7.0000 |
| A5 = | 2.85368D−09 | P5 = | 8.0000 |
| A6 = | 2.82284D−10 | P6 = | 9.0000 |
| A7 = | 3.89524D−11 | P7 = | 10.0000 |
| A8 = | 7.66816D−12 | P8 = | 11.0000 |
| A9 = | 1.64786D−12 | P9 = | 12.0000 | where the d-variable and backfocus $f_B$ are the following values according to the focal length.

| | W-P | M-P | T-P |
|---|---|---|---|
| f | 36.22 | 49.63 | 68.30 |
| d-variable | 30.00 | 13.20 | 0.80 |
| fB | 38.86 | 46.81 | 57.86 |

| | |
|---|---|
| fI = | −61.66 |
| fII = | 36.51 |

Total of displacement from the spherical surface in $\phi = 0.16$ fII of the aspherical lens
$\Delta X = -1.04 \times 10^{-03}$ fII

Embodiment 14
f = 36.0–68.3  F3.6–4.6  2ω = 64°–35°

| No. | R | d | nd | ν |
|---|---|---|---|---|
| 1 | 92.036 | 1.50 | 1.70154 | 41.2 |
| 2 | 25.402 | 2.80 | | |
| 3 | 46.287 | 1.40 | 1.77250 | 49.6 |
| 4 | 30.496 | 4.90 | | |
| 5 | 28.093 | 2.90 | 1.80518 | 25.4 |
| 6 | 45.282 | variable | | |
| 7 | 17.776 | 4.80 | 1.60311 | 60.7 |
| 8 | 227.430 | 2.40 | | |
| 9 | 17.171 | 3.20 | 1.51823 | 59.0 |
| 10 | 45.402 | 1.00 | | |
| 11 | −568.314 | 2.60 | 1.80518 | 25.4 |
| 12 | 16.588 | 3.20 | | |
| 13 | −21.963 | 1.50 | 1.49200 | 55.0 |
| 14 | −25.079 | 0.20 | | |
| 15 | 24.608 | 2.00 | 1.68893 | 31.1 |
| 16 | 70.462 | | | |

Coefficient of aspherical surface

13

| | | | |
|---|---|---|---|
| K = | −7.08017D+00 | | |
| A1 = | 2.37220D−06 | P1 = | 4.0000 |
| A2 = | 4.95365D−07 | P2 = | 5.0000 |
| A3 = | 2.42526D−07 | P3 = | 6.0000 |
| A4 = | 5.17500D−08 | P4 = | 7.0000 |
| A5 = | 7.69999D−09 | P5 = | 8.0000 |
| A6 = | 8.54876D−10 | P6 = | 9.0000 |
| A7 = | 5.79117D−11 | P7 = | 10.0000 |
| A8 = | −3.03218D−12 | P8 = | 11.0000 |
| A9 = | −2.09939D−12 | P9 = | 12.0000 |

14

| | | | |
|---|---|---|---|
| K = | −1.47504D+01 | | |
| A1 = | 1.55122D−05 | P1 = | 4.0000 |
| A2 = | 4.61279D−06 | P2 = | 5.0000 |
| A3 = | 6.24686D−07 | P3 = | 6.0000 |
| A4 = | 6.60123D−08 | P4 = | 7.0000 |
| A5 = | 5.75887D−09 | P5 = | 8.0000 |
| A6 = | 3.97177D−10 | P6 = | 9.0000 |
| A7 = | 1.78704D−11 | P7 = | 10.0000 |
| A8 = | 7.01305D−14 | P8 = | 11.0000 |
| A9 = | −1.28603D−15 | P9 = | 12.0000 | where the d-variable and backfocus $f_B$ are the following values according to the focal length.

|   | W-P | M-P | T-P |
|---|---|---|---|
| f | 36.01 | 49.82 | 68.30 |
| d-variable | 31.50 | 13.50 | 0.80 |
| fB | 38.69 | 46.75 | 57.53 | fI = −63.30
fII = 36.94

Total of displacement from the spherical surface in $\phi = 0.16$ fII of the aspherical lens
$\Delta X = -2.21 \times 10^{-03}$ fII

Embodiment 15
$f = 42.0 - 72.0 \quad F3.6 - 4.6 \quad 2\omega = 57°-33°$

| No. | R | d | nd | ν |
|---|---|---|---|---|
| 1 | −2288.753 | 1.60 | 1.71700 | 47.9 |
| 2 | 26.014 | 4.77 |  |  |
| 3 | 30.391 | 3.50 | 1.71736 | 29.5 |
| 4 | 63.330 | variable |  |  |
| 5 | 27.284 | 3.00 | 1.60311 | 60.7 |
| 6 | −435.268 | 0.20 |  |  |
| 7 | 20.258 | 3.00 | 1.58913 | 61.0 |
| 8 | 79.682 | 3.00 |  |  |
| 9 | 310.062 | 5.99 | 1.80518 | 25.4 |
| 10 | 16.079 | 4.06 |  |  |
| 11 | −68.430 | 1.20 | 1.67003 | 47.3 |
| 12 | −96.486 | 0.50 |  |  |
| 13 | 37.726 | 2.50 | 1.68893 | 31.1 |
| 14 | −673.486 |  |  |  |

Coefficient of aspherical surface

11
K = 5.45002D+00
A1 = −1.58378D−06    P1 = 4.0000
A2 = −2.75146D−08    P2 = 5.0000
A3 = −1.87825D−07    P3 = 6.0000
A4 = −2.10650D−08    P4 = 7.0000
A5 = 1.51872D−12    P5 = 8.0000
A6 = 3.16137D−10    P6 = 9.0000
A7 = 4.99426D−11    P7 = 10.0000
A8 = 2.48801D−12    P8 = 11.0000
A9 = −7.88540D−13    P9 = 12.0000

12
K = −3.46966D+01
A1 = 1.36769D−05    P1 = 4.0000
A2 = −1.55368D−06    P2 = 5.0000
A3 = −4.89078D−08    P3 = 6.0000
A4 = 1.00050D−08    P4 = 7.0000
A5 = 1.04251D−09    P5 = 8.0000
A6 = −3.20831D−11    P6 = 9.0000
A7 = −1.62683D−11    P7 = 10.0000
A8 = −4.06183D−13    P8 = 11.0000
A9 = 6.63433D−13    P9 = 12.0000 where the d-variable and backfocus $f_B$ are the following values according to the focal length.

|   | W-P | M-P | T-P |
|---|---|---|---|
| f | 42.02 | 55.14 | 72.00 |
| d-variable | 28.30 | 12.70 | 1.00 |
| fB | 39.54 | 46.62 | 55.72 | fI = −71.45
fII = 38.55

Total of displacement from the spherical surface in $\phi = 0.16$ fII of the aspherical lens
$\Delta X = -8.43 \times 10^{-04}$ fII

Embodiment 16
$f = 28.9 - 68.0 \quad F4 - 4.5 \quad 2\omega = 76°-35°$

| No. | R | d | nd | ν |
|---|---|---|---|---|
| 1 | 67.457 | 4.30 | 1.62299 | 58.2 |
| 2 | 270.213 | 0.20 |  |  |
| 3 | 109.605 | 1.80 | 1.83400 | 37.2 |
| 4 | 23.500 | 6.90 |  |  |
| 5 | 460.000 | 1.40 | 1.71300 | 53.8 |
| 6 | 37.284 | 4.50 |  |  |
| 7 | 35.574 | 4.10 | 1.80518 | 25.4 |
| 8 | 110.398 | variable |  |  |
| 9 | 31.069 | 3.50 | 1.65844 | 50.9 |
| 10 | 513.594 | 2.30 |  |  |
| 11 | 27.901 | 3.50 | 1.61272 | 58.7 |
| 12 | 46.978 | 0.20 |  |  |
| 13 | 21.213 | 3.50 | 1.61272 | 58.7 |
| 14 | 44.618 | 1.20 |  |  |
| 15 | 205.468 | 4.80 | 1.84666 | 23.8 |
| 16 | 15.477 | 3.00 |  |  |
| 17 | −810.657 | 1.50 | 1.83400 | 37.2 |
| 18 | 75.063 | 0.20 |  |  |
| 19 | 31.561 | 3.50 | 1.60342 | 28.0 |
| 20 | −38.240 |  |  |  |

Coefficient of aspherical surface

17
K = 1.75422D+00
A1 = −4.52256D−06    P1 = 4.0000
A2 = −2.95369D−07    P2 = 5.0000
A3 = −3.12816D−09    P3 = 6.0000
A4 = 8.71477D−10    P4 = 7.0000
A5 = 3.07059D−10    P5 = 8.0000
A6 = 8.91919D−11    P6 = 9.0000
A7 = 1.59640D−11    P7 = 10.0000
A8 = 8.34477D−13    P8 = 11.0000
A9 = −5.83606D−13    P9 = 12.0000

18
K = −1.20752D+00
A1 = 5.19195D−06    P1 = 4.0000
A2 = 2.21185D−07    P2 = 5.0000
A3 = −2.25310D−08    P3 = 6.0000
A4 = −9.73761D−10    P4 = 7.0000
A5 = 6.19352D−10    P5 = 8.0000
A6 = 1.42268D−10    P6 = 9.0000
A7 = 1.44367D−11    P7 = 10.0000
A8 = −3.00474D−13    P8 = 11.0000
A9 = −4.29547D−13    P9 = 12.0000 where the d-variable and backfocus $f_B$ are the following values according to the focal length.

|   | W-P | M-P | T-P |
|---|---|---|---|
| f | 28.92 | 44.34 | 68.00 |
| d-variable | 39.00 | 16.00 | 1.00 |
| fB | 37.15 | 48.52 | 65.95 | fI = −50.93
fII = 37.54

Total of displacement from the spherical surface in $\phi = 0.16$ fII of the aspherical lens
$\Delta X = -4.16 \times 10^{-04}$ fII As can be seen in the above-described embodiments, in the zoom lens system according to the present invention, the full length of the lens is short even at the short focal point end, and accordingly, the diameter of the lens can be made small to realize an extremely compact zoom lens. In addition, as can be seen in the aberration curves, the aberrations are well corrected despite the simple construction.

While in the embodiments, examples are illustrated in which both surfaces of a single lens are formed into an aspherical configuration, it should be noted that the present invention is, needless to say, applied to the case where even one side or each side of the positive lens and negative lens is formed into an aspherical configuration.

What is claimed is:

1. A zoom lens system comprising two groups, namely, a front group I having a negative refracting power as a whole and a rear group II having a positive refracting power as a whole, wherein an air space between the front and rear groups is varied to thereby effect zooming, characterized in that the rear-group lens including a set of positive and negative lenses at the rearmost portion thereof, at least one surface of the positive and negative lenses being formed into an aspherical surface, and the displacement $\Delta X$ of the aspherical surface is given, at the height of $\phi = 0.16\ f_{II}$ from an optical axis, by $$\Delta X = \Delta X_A(0.16 f_{II}) - \Delta X_B(0.16 f_{II}) + \Delta X_C(0.16 f_{II}) - \Delta X_D(0.16 f_{II}) < 0$$

where $$\Delta X(\phi) = \frac{C\phi^2}{1 + \sqrt{1 - (1+k)C^2\phi^2}} + \sum_i A_i \phi p_i - \frac{C^*\phi^2}{1 + \sqrt{1 - C^{*2}\phi^2}}$$

$\phi$: height from an optical axis
$f_{II}$: synthesized focal length of the rear-group lens I
K: coefficient of the secondary curve
$C^*$: paraxial curvature ($= C + 2A_i(P_i = 2)$)
$\Delta X_A(\phi)$: $X(\phi)$ of the object side of the positive lens
$\Delta X_B(\phi)$: $X(\phi)$ of the image side of the positive lens
$\Delta X_C(\phi)$: $X(\phi)$ of the object side of the negative lens
$\Delta X_D(\phi)$: $X(\phi)$ of the image side of the negative lens.

2. A two-group zoom lens as claimed in claim 1 in which the negative lens at the rearmost portion of said rear-group lens is an aspherical lens.

3. A two-group zoom lens as claimed in claim 1 in which the positive lens at the rearmost portion of said rear-group lens is an aspherical lens.

4. A two-group lens as claimed in claim 1 in which said displacement $\Delta X$ of the aspherical surface is satisfied, at the height of $\phi = 0.16\ f_{II}$ when the synthesized focal length of the rear-group lens is $f_{II}$, with $$1 \times 10^{-0.5} < |\Delta X(0.16 f_{II})/f_{II}| < 5 \times 10^{-0.2},\ \Delta X < 0$$

5. A two-group zoom lens having, in a zoom lens system, a front-group lens I which comprises at least one negative lens and one positive lens in order from the object side, and a rear-group lens II which comprises two positive lenses, one first negative lens, positive lens $P_L$ and a negative lens $N_L$ in order from the object side, characterized in that at least one surface of said positive lens $P_L$ and negative lens $N_L$ is formed into an aspherical surface, and which lens is satisfied with $$50 < \nu p$$

$$0.10 < l/f_{II} < 0.4$$

$$n_p L < 1.78$$

where $\nu p$: mean value of Abbe number of glass of at least two positive lenses arrayed in order from the object side in the rear-group lens II l: axial length from the rear surface of the first negative lens to the front surface of the negative lens $N_L$ $n_p L$: refractive index of line d of a lens material of the positive lens $P_L$.

6. A zoom lens as claimed in claim 5 in which the front-group lens I comprises one positive lens and at least one negative lens and one positive lens in order from the object side.

7. A two-group zoom lens having, in a zoom lens system, a front-group lens I which comprises at least one negative lens and one positive lens in order from the object side, and a rear-group lens II which comprises two positive lenses, one first negative lens, a negative lens $N_L$ and a positive lens $P_L$ in order from the object side, characterized in that at least one surface of said negative lens $N_L$ and positive lens $P_L$ is formed into an aspherical surface, and which lens is satisfied with $$50 < \nu p$$

$$0.07 < l/f_{II} < 0.32$$

$$n_p L < 1.78$$

where $\nu p$: mean value of Abbe number of glass of at least two positive lenses arrayed in order from the object side in the rear-group lens II l: axial length from the rear surface of the first negative lens to the front surface of the positive lens $P_L$ $n_p L$: refractive index of line d of a lens material of the positive lens $P_L$.

8. A zoom lens as claimed in claim 7 in which the front-group lens I comprises one positive lens, at least one negative lens and one positive lens.

* * * * *